(12) United States Patent
Krieger et al.

(10) Patent No.: US 10,719,591 B1
(45) Date of Patent: *Jul. 21, 2020

(54) AUTHENTICATION OF AUDIO-BASED INPUT SIGNALS

(71) Applicant: Google Inc., Mountain View, CA (US)

(72) Inventors: Ken Krieger, Jackson, WY (US); Andrew Joseph Alexander Gildfind, London (GB); Nicholas Salvatore Arini, Southampton (GB); Simon Michael Rowe, London (GB); Raimundo Mirisola, Zug (CH); Gaurav Bhaya, Sunnyvale, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,316

(22) Filed: Jun. 29, 2017

Related U.S. Application Data

(63) Continuation-in-part of application No. 15/395,729, filed on Dec. 30, 2016, and a continuation-in-part of
(Continued)

(51) Int. Cl.
*H04N 21/422* (2011.01)
*H04N 21/436* (2011.01)
(Continued)

(52) U.S. Cl.
CPC ......... *G06F 21/32* (2013.01); *G06K 9/00288* (2013.01); *G10L 17/005* (2013.01);
(Continued)

(58) Field of Classification Search
CPC ......... H04N 2007/145; H04N 21/4126; H04N 21/42203; H04N 21/42204;
(Continued)

(56) References Cited

U.S. PATENT DOCUMENTS 6,275,806 B1   8/2001   Pertrushin
6,421,453 B1   7/2002   Kanevsky et al.
(Continued)

FOREIGN PATENT DOCUMENTS

CN     105208014 A     12/2015

OTHER PUBLICATIONS

"Walmart and Google to offer voice-enabled shopping", BBC News, Aug. 23, 2017 (10 pages).
(Continued)

*Primary Examiner* — Mulugeta Mengesha
*Assistant Examiner* — Alazar Tilahun
(74) *Attorney, Agent, or Firm* — Foley & Lardner LLP; James De Vellis

(57) ABSTRACT

The present disclosure is generally directed a data processing system for authenticating packetized audio signals in a voice activated computer network environment. The data processing system can improve the efficiency and effectiveness of auditory data packet transmission over one or more computer networks by, for example, disabling malicious transmissions prior to their transmission across the network. The present solution can also improve computational efficiency by disabling remote computer processes possibly affected by or caused by the malicious audio signal transmissions. By disabling the transmission of malicious audio signals, the system can reduce bandwidth utilization by not transmitting the data packets carrying the malicious audio signal across the networks.

20 Claims, 16 Drawing Sheets

Related U.S. Application Data application No. 14/933,937, filed on Nov. 5, 2015, which is a continuation-in-part of application No. 13/843,559, filed on Mar. 15, 2013, now abandoned.

(51) Int. Cl.

| | | |
|---|---|---|
| *G06F 21/32* | (2013.01) | |
| *H04N 21/258* | (2011.01) | |
| *G06K 9/00* | (2006.01) | |
| *G10L 17/00* | (2013.01) | |
| *G10L 17/24* | (2013.01) | |
| *H04L 29/06* | (2006.01) | |
| *H04N 21/442* | (2011.01) | |
| *H04N 21/4223* | (2011.01) | |

(52) U.S. Cl.
CPC ............ *G10L 17/24* (2013.01); *H04L 63/107* (2013.01); *H04N 21/4223* (2013.01); *H04N 21/42203* (2013.01); *H04N 21/44218* (2013.01)

(58) Field of Classification Search
CPC ....... H04N 21/42207; H04N 21/44222; H04N 21/233; H04N 21/4394; H04N 21/4627; H04N 21/4882; H04N 21/6582; H04N 21/8106; H04N 21/8352; H04N 21/8358; H04N 5/04; H04N 5/60; H04N 21/4223; H04N 21/44218; G06F 21/32; H04L 63/107; G06K 9/00288; G10L 17/24; G10L 17/005
See application file for complete search history.

(56) References Cited

U.S. PATENT DOCUMENTS

| | | | |
|---|---|---|---|
| 6,684,249 B1 | 1/2004 | Frerichs et al. | |
| 6,857,007 B1 | 2/2005 | Bloomfield | |
| 7,636,456 B2 | 12/2009 | Collins et al. | |
| 7,853,255 B2 | 12/2010 | Karaoguz et al. | |
| 8,027,518 B2 | 9/2011 | Baker et al. | |
| 8,091,100 B2 | 1/2012 | Donato | |
| 8,195,133 B2 | 6/2012 | Ramer et al. | |
| 8,386,386 B1 | 2/2013 | Zhu | |
| 8,504,691 B1 | 8/2013 | Tobler et al. | |
| 8,769,557 B1 | 7/2014 | Terrazas | |
| 8,903,716 B2 | 12/2014 | Chen et al. | |
| 2002/0149705 A1* | 10/2002 | Allen | H04N 7/173 18 348/734 |
| 2005/0185779 A1 | 8/2005 | Toms | |
| 2006/0041926 A1* | 2/2006 | Istvan | H04N 5/4403 725/133 |
| 2007/0097975 A1 | 5/2007 | Rakers et al. | |
| 2007/0127688 A1 | 6/2007 | Doulton | |
| 2008/0071537 A1 | 3/2008 | Tamir et al. | |
| 2009/0146779 A1* | 6/2009 | Kumar | G06K 9/00885 340/5.31 |
| 2009/0217324 A1* | 8/2009 | Massimi | H04H 20/106 725/46 |
| 2009/0262069 A1 | 10/2009 | Huntington | |
| 2010/0306394 A1 | 12/2010 | Brown et al. | |
| 2011/0314530 A1 | 12/2011 | Donaldson | |
| 2012/0135684 A1* | 5/2012 | Shrum, Jr. | H04N 21/25808 455/41.2 |
| 2012/0140069 A1* | 6/2012 | Ding | H04H 60/31 348/143 |
| 2012/0245941 A1 | 9/2012 | Cheyer | |
| 2012/0265528 A1 | 10/2012 | Gruber et al. | |
| 2013/0097682 A1* | 4/2013 | Zeljkovic | H04L 9/3231 726/7 |
| 2013/0117022 A1 | 5/2013 | Chen et al. | |
| 2013/0156273 A1 | 6/2013 | Nielsen | |
| 2013/0173765 A1 | 7/2013 | Korbecki | |
| 2013/0275164 A1 | 10/2013 | Gruber et al. | |
| 2013/0304758 A1 | 11/2013 | Gruber et al. | |
| 2013/0329966 A1 | 12/2013 | Hildreth | |
| 2014/0150002 A1* | 5/2014 | Hough | H04N 21/4415 725/9 |
| 2014/0222436 A1 | 8/2014 | Binder et al. | |
| 2014/0249817 A1 | 9/2014 | Hart et al. | |
| 2015/0090781 A1 | 4/2015 | Yang | |
| 2015/0142438 A1 | 5/2015 | Dai et al. | |
| 2015/0371639 A1 | 12/2015 | Foerster et al. | |
| 2016/0093304 A1 | 3/2016 | Kim et al. | |
| 2016/0218884 A1 | 7/2016 | Ebrom et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |
| 2018/0069963 A1 | 3/2018 | Chen et al. | |

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexis, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).

(56) References Cited

OTHER PUBLICATIONS

Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion on PCT Application No. PCT/US2017/049721 dated Dec. 1, 2017.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Office Action on U.S. Appl. No. 13/843,559 dated Jan. 12, 2015.
Office Action on U.S. Appl. No. 13/843,559 dated Jun. 16, 2014.
Office Action on U.S. Appl. No. 14/933,937 dated Dec. 19, 2016.
Office Action on U.S. Appl. No. 14/933,937 dated Jun. 9, 2016.
Office Action on U.S. Appl. No. 14/933,937 dated May 10, 2017.
Office Action on U.S. Appl. No. 14/933,937 dated Nov. 17, 2017.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Sahota, Mantej Singh, "Voice Recognition System Based on Audio Fingerprinting", Fall 2010. Available at http://csus-dspace.calstate.edu/bitstream/handle/10211.9/838/Report.pdf?sequence=1.
Seifert, Dan, $201CSamsung$2019s new virtual assistant will make using your phone easier$201D, The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017 (5 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Non-Final Office Action on U.S. Appl. No. 15/395,729 dated Aug. 9, 2018.
Office Action on U.S. Appl. No. 14/933,937 dated Apr. 19, 2018.
Office Action on U.S. Appl. No. 15/628,279 dated Jun. 25, 2018.
KR Office Action for Appl. Ser. No. 10-2017-7031374 dated May 7, 2019 (19 pages).
U.S. Notice of Allowance for U.S. Appl. No. 15/395,729 dated May 21, 2019 (16 pages).
Non-Final Office Action on U.S. Appl. No. 15/863,042 dated Apr. 3, 2019.
Foreign Search Report on EP 19179005.4 dated Jul. 31, 2019 (9 pages).
Non-Final Office Action for U.S. Appl. No. 15/628,279 dated Oct. 31, 2019 (28 pages).
Office Action for KR 10-2017-7031374 dated Oct. 17, 2019 (6 pages).
Reason for Refusal for JP 2017-556917 dated Nov. 5, 2019 (4 pages).
Non-Final Office Action on U.S. Appl. No. 15/628,279 dated Oct. 31, 2019 (28 pages).
Notice of Allowance on U.S. Appl. No. 15/395,729 dated Sep. 13, 2019 (17 pages).
Notice of Allowance on U.S. Appl. No. 15/863,042 dated Sep. 16, 2019 (18 pages).
Non-Final Office Action for U.S. Appl. No. 15/862,963 dated Jan. 3, 2020 (18 pages).

* cited by examiner

AUTHENTICATION OF AUDIO-BASED INPUT SIGNALS

CROSS-REFERENCE TO RELATED APPLICATIONS

This application claims the benefit of priority under 35 U.S.C. § 120 as a continuation-in-part of U.S. patent application Ser. No. 14/933,937, filed Nov. 5, 2015, which claims the benefit of priority under 35 U.S.C. § 120 as a continuation-in-part of U.S. application Ser. No. 13/843,559, filed Mar. 15, 2013. This application also claims the benefit of priority under 35 U.S.C. § 120 as a continuation-in-part of U.S. patent application Ser. No. 15/395,729, filed Dec. 30, 2016. Each of the foregoing applications is hereby incorporated by reference in their entirety.

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response if the responding computing device is at or above its processing capacity, which may result in inefficient bandwidth utilization. A portion of the excessive network transmissions can include malicious network transmissions.

SUMMARY

According to at least one aspect, a presence and authentication system includes an interface to receive an audio-based input detected by a microphone of a second computing device. The system can include a feature recognition engine to generate an audio fingerprint based on the audio-based input. The system can include a location engine. The location engine can receive a first location indication associated with the second computing device. The first location indication can represent a first physical location. The location engine can receive a second location indication associated with a third computing device. The second location indication can represent a second physical location that is different than the first physical location. The system can include a network security appliance. The network security appliance can determine a confidence score that the audio fingerprint is associated with a registered user of the second computing device. The confidence score can be based on the first location indication and the second location indication. The network security appliance can identify, based on the confidence score being above a predetermined threshold, an action identified within the audio-based input. The network security appliance can select a digital component based on the action identified within the audio-based input. The network security appliance can transmit, to the second computing device via the interface, the digital component.

According to at least one aspect, a method to authenticate users can include receiving an audio-based input detected by a microphone of a second computing device. The method can include generating, by a feature recognition engine, an audio fingerprint based on the audio-based input. The method can include receiving, by a location engine, a first location indication that is associated with the second computing device. The first location indication can represent a first physical location. The method can include receiving, by the location engine, a second location indication associated with a third computing device. The second location indication can represent a second physical location that is different than the first physical location. The method can include determining, by a network security appliance, a confidence score that the audio fingerprint is associated with a registered user of the second computing device based on the first location indication and the second location indication. The method can include identifying, by the network security appliance and based on the confidence score being above a predetermined threshold, an action identified within the audio-based input. The method can include selecting, by the network security appliance, a digital component based on the action identified within the audio-based input. The method can include transmitting, by the network security appliance and to the second computing device via the interface, the digital component.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
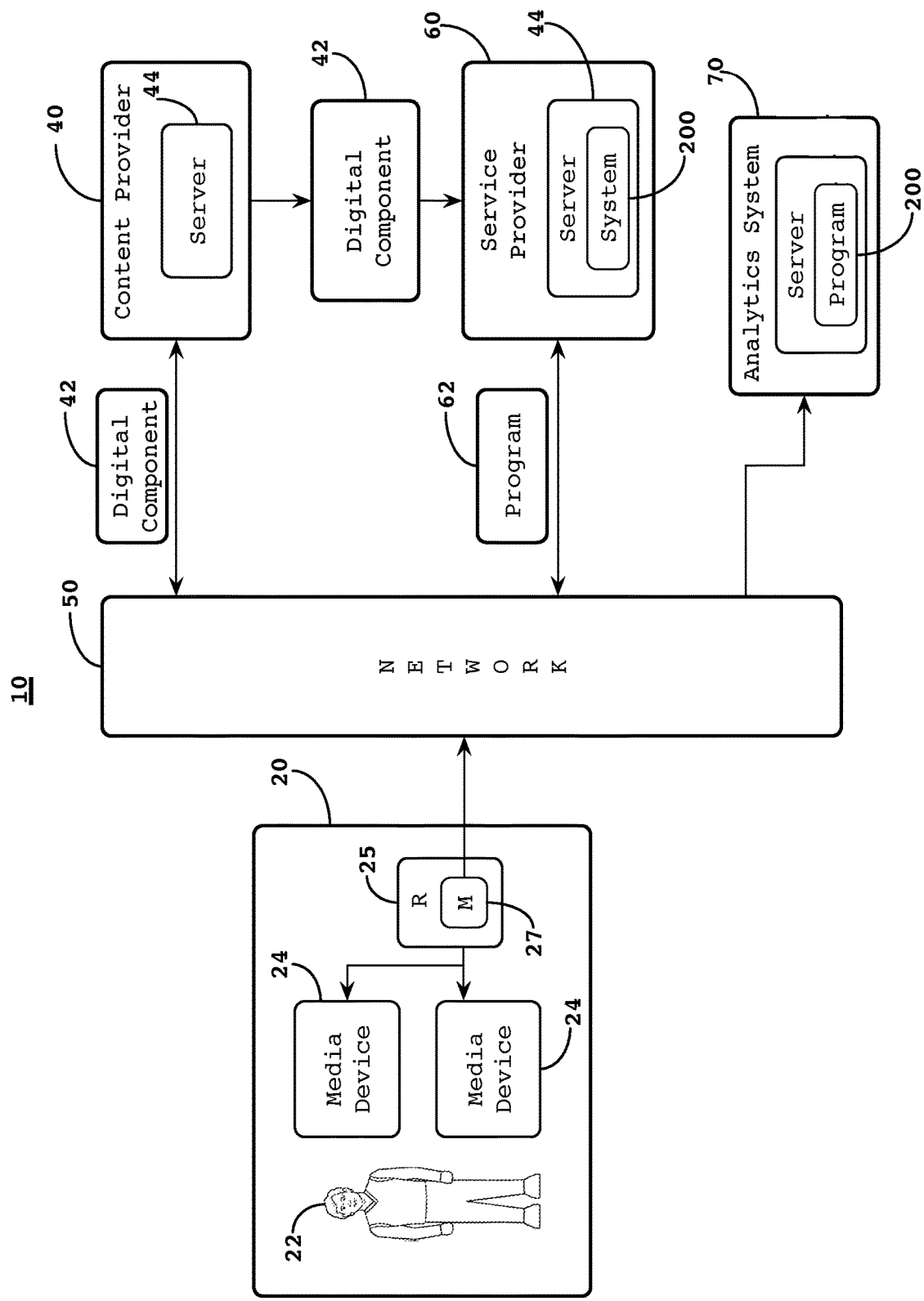
FIGS. 1A-1C illustrate example environments in which viewer presence and authentication are enabled.

Following below are more detailed descriptions of various concepts related to, and implementations of, methods, apparatuses, and systems for the authentication of packetized audio signals. The various concepts introduced above and discussed in greater detail below may be implemented in any of numerous ways.

The present disclosure is generally directed a data processing system for authenticating packetized audio signals in a voice activated computer network environment. The data processing system can improve the efficiency and effectiveness of auditory data packet transmission over one or more computer networks by, for example, disabling malicious transmissions prior to their transmission across the network. The present solution can also improve computational efficiency by disabling remote computer processes possibly affected by or caused by the malicious audio signal transmissions. By disabling the transmission of malicious audio signals, the system can reduce bandwidth utilization by not transmitting the data packets carrying the malicious audio signal across the networks. Processing the naturally spoken audio signal can be a computationally intensive task. By detecting possibly malicious audio signals, the system can reduce computational waste by enabling the system to skip or temporarily skip the processing of possibly malicious audio signals. The system can reduce computational waste by disabling communication sessions when the malicious activity is detected.

The systems and methods described herein can include a data processing system that receives an audio input query, which can also be referred to as an audio input signal. From the audio input query the data processing system can identify a request and a trigger keyword corresponding to the request. The system can generate action data structures based on the audio input query. The system can also measure characteristics of the audio input query. The system can determine if the characteristics of the audio input query match predicted or expected characteristics of the audio input query. If the characteristics do not match the expected characteristics, the system can select a content item that is transmitted back to the source of the audio input query. A communication session can be started with the source. The content item can include an output signal that can be played through a speaker associated with the source. The system can receive a response audio signal to the content item. The response audio signal can also include characteristics that are compared by the system to expected characteristics. If the characteristics of the response audio signal do not match the expected characteristics, the system can disable the communication sessions with the source and prevent the source from initiating communication sessions with third-party service providers or content providers, which saves network bandwidth, reduces processor utilization, and saves electrical power.

The present solution can prevent the transmission of insecure audio-based user interactions by authenticating the interaction. Securing audio-based user interactions can prevent malicious processes from being executed under the user (or other's) account. Preventing the execution of malicious processes can also reduce network bandwidth utilization and reduce processor utilization or load. The present solution can reduce network bandwidth utilization by terminating the transmission of unauthorized audio-based user interactions.

Media consumption is becoming increasingly personalized. This trend is rapidly moving from classic interne experience to all manner of devices in the home, including televisions. However, many televisions (and game consoles) are "shared" media devices. Adding personalization has the potential to greatly increase the value of a viewer's experience, but a barrier to making this seamless is the ability to authenticate the viewer. New television services, particularly Internet Protocol television (IPTV)-related services may allow the viewer to sign in to the service. Currently, such a sign-in may involve use of a cumbersome user interface or text entry system. Furthermore, there is no easy way for the viewer to log out for a short period.

A related problem exists in the media measurement space. For measurement purposes, it is important to know which viewer is watching television at any given time (known as "presence"). This problem may be solved by asking viewers to log in and out using a special remote control. However, this solution may present a significant cost to implement and may lead to compliance issues. Even if a truly "personalized" service was available, such a service might not be used with enough consistency for media metrics measurement.

Voice and gesture control systems, mechanisms, and devices are in use to control access to various media devices. For example, television remote control devices may incorporate a voice activated feature that allows a viewer to turn the television, and change channels and volume. The voice activation feature also may be used to sign on to a service (as noted above), purchase a pay-per-view movie, and complete other transactions that in the past required manual entry using buttons on the remote control. Use of voice control may enhance the viewer's television viewing experience by doing away with cumbersome on-screen interfaces and eliminating the need to find a specific button in a sea of remote control buttons. In addition to voice recognition, some systems incorporate gesture control, whereby a small camera on a television, for example, captures viewer gestures to identify an action requested by the viewer, such as to turn the television volume down.

To overcome problems with presence determination as an element of an effective media measurement system, disclosed herein are presence and authentication systems and methods that, in an embodiment, use audio and video fingerprinting to detect and confirm the presence of a viewer at a media device, particularly a shared media device such as a television. The use of such audio or video biometric fingerprinting, either separately or in combination, presents a largely passive solution to the problems noted above.

Video fingerprinting, in particular, may operate to determine the presence of individual viewers among a group of viewers. Video fingerprinting may provide depth of field information, which helps to isolate a viewer from the background. Facial recognition, which may include a depth of field component, may be used as one aspect of video fingerprinting to determine the presence of a specific viewer. In addition, gesture analysis, which may provide for some kind of "pass-gesture" as well as basic physical attributes such as size and possibly gait analysis, may be used as part of the video fingerprinting process—for example, by pointing a camera at the room's doorway and measuring the height of viewers as they walk into or out of the room.

Some television platforms and some set top boxes (STBs) incorporate processors that are capable of passive viewer identity processes for presence and authentication purposes by capturing certain biometric information about the viewer, such a video or audio fingerprint of the viewer, as noted above. However, in addition to the processing capability, and any required identity programming, these media devices require some additional hardware, firmware, and/or software to capture the biometric information. Some televisions are being produced with small cameras capable of capturing such information. The cameras generally have a wide lens and are directed toward the intended viewing audience. Similarly, some televisions incorporate microphones that may be used for audio fingerprinting of viewers.

With respect to viewer identity, using a video camera connected to the media device, facial recognition software may be employed as a tool in detecting the number and identities of viewers in real time. A media device with a video camera (or still camera) may capture the facial images of viewers in a viewing location (e.g., in a room such as the viewers' living room) as the viewers come and go, and may use this information to personalize or improve the viewers' viewing experience and to better measure the viewers' viewing history.

Generally, facial recognition is a computer-based system for automatically identifying or verifying a person from a digital image or a video frame. Recognition algorithms include at least two main approaches. A geometric approach looks at distinguishing facial features, while a photometric approach is a statistical approach that distills an image into values and compares the values with templates to eliminate variances in order to find a match. The selected facial features may be, for example, the relative position, size, and/or shape of the eyes, nose, cheekbones, and jaw. These salient features then are compared with features of other images in a data set to locate matching features.

When using a computerized multimedia device such as a smart television, a viewer may choose to initially associate his face with his identity. For example, the viewer may sign on to a service such as a streaming video service and register an image of his face with the service. When the viewer subsequently accesses his account, the multimedia device may capture a current image of the viewer's face and use that image to verify the presence and authenticate the identity of the viewer. One advantage of this approach is that it is passive-that is, this approach does not require any subsequent log-in/log-out actions by the viewer. This passive approach to determining viewer presence may enhance the viewer's viewing experience. Alternatively, the viewer may associate an image of his face with his identity when initially setting up the media device-that is, the facial image is stored in a database on the multimedia device.

Even if a viewer chooses not to identify himself as above, knowing a "logical identity" (e.g., the facial recognition software recognizes the same viewer as these other times) or a general category (e.g., a male as distinguished from a female when a viewing location is known normally to be populated only by males, may help identify the viewer, as described below.

Accurate measurement of media consumption metrics may hinge on more than just viewing history. In particular, media consumption measurement may be improved by accurate determination of viewer presence when multiple viewers are present, and when multiple types of media devices are in use. For example, although one viewer in a household may watch a particular sporting event on a home media device (e.g. a television), commercials related to the sporting event may be of limited interest to other viewers in the household. This is where the use of identity along with viewing history becomes valuable. Viewing history may be recorded with respect to the identities of the viewers present in the room during different shows. Each viewer may have a different history.

In summary, gathering a viewing history for each viewer based on a passive, auto-recognized identity, inferring demographic or viewer's interests information based on past shows that each individual has watched, possibly combined with other program provider account information (e.g., search history or profile and other information available at a social networking website) provides a great amount of highly relevant information in selecting better digital component choices. Some media devices can dynamically display the digital components that are relevant to the viewers that are present based on this information. A digital component can include a content item, digital document (e.g., a webpage), images, videos, audio files, or other forms of digital content. In some implementations, a digital component can be a component of a content item or a content item can be a component of a digital component.

In implementations discussed herein, viewers may explicitly identify themselves each time they sit in front of the television, rather than automatically being detected by a video camera. This type of identification is essentially "logging in" to watch television. Explicit incentives for this process may be provided such as special deals on products for watching a particular show, or restricting access to certain shows.

In other embodiments disclosed herein, viewer presence may begin by picking up the viewers' faces with a camera (e.g., a wide-angled front-facing camera) embedded in or mounted on the television or some component of the television, and using facial recognition, matching the viewers' faces with faces associated in some way to online social networking profiles.

Figure 1B:
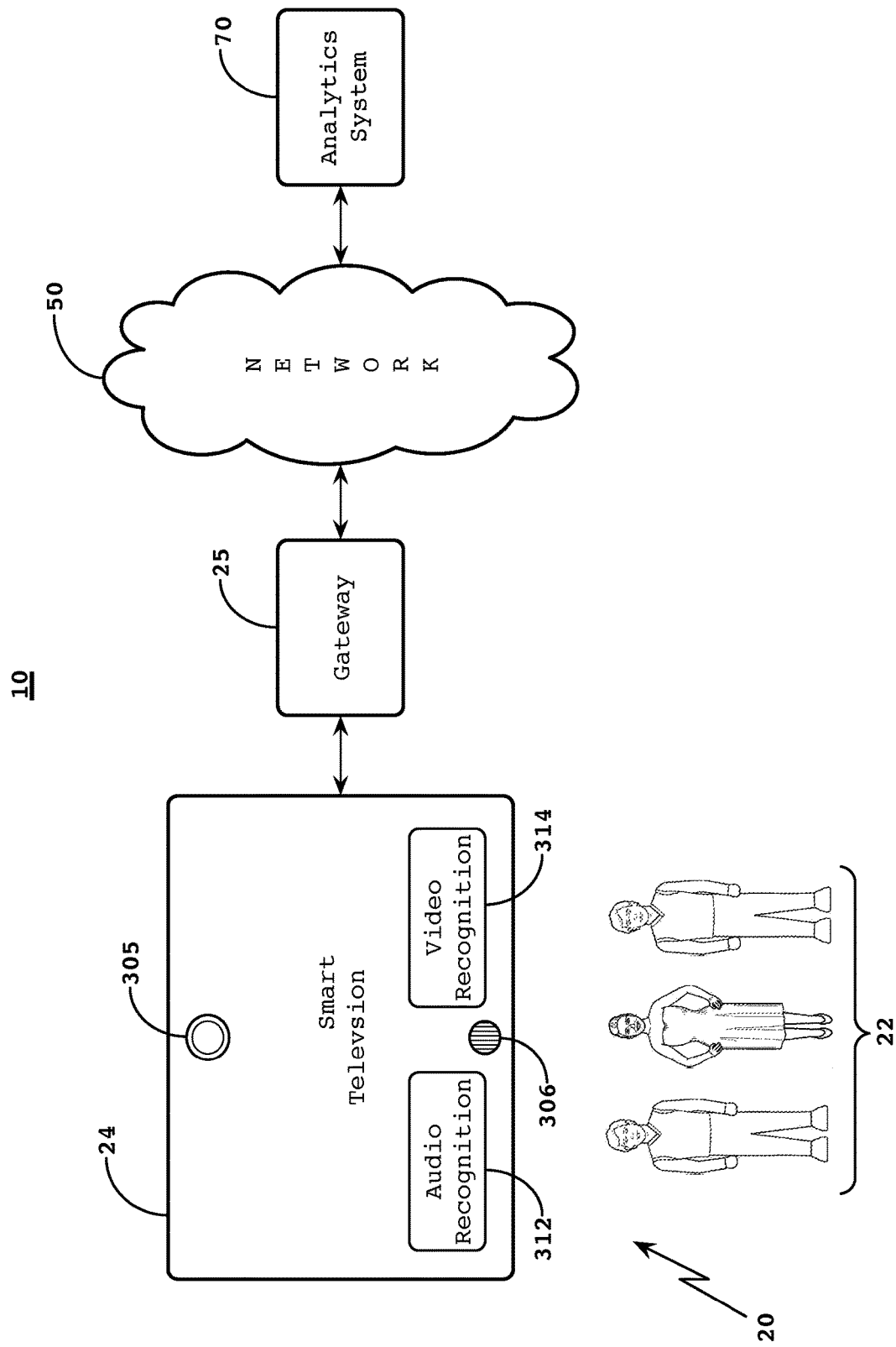
Figure 1C:
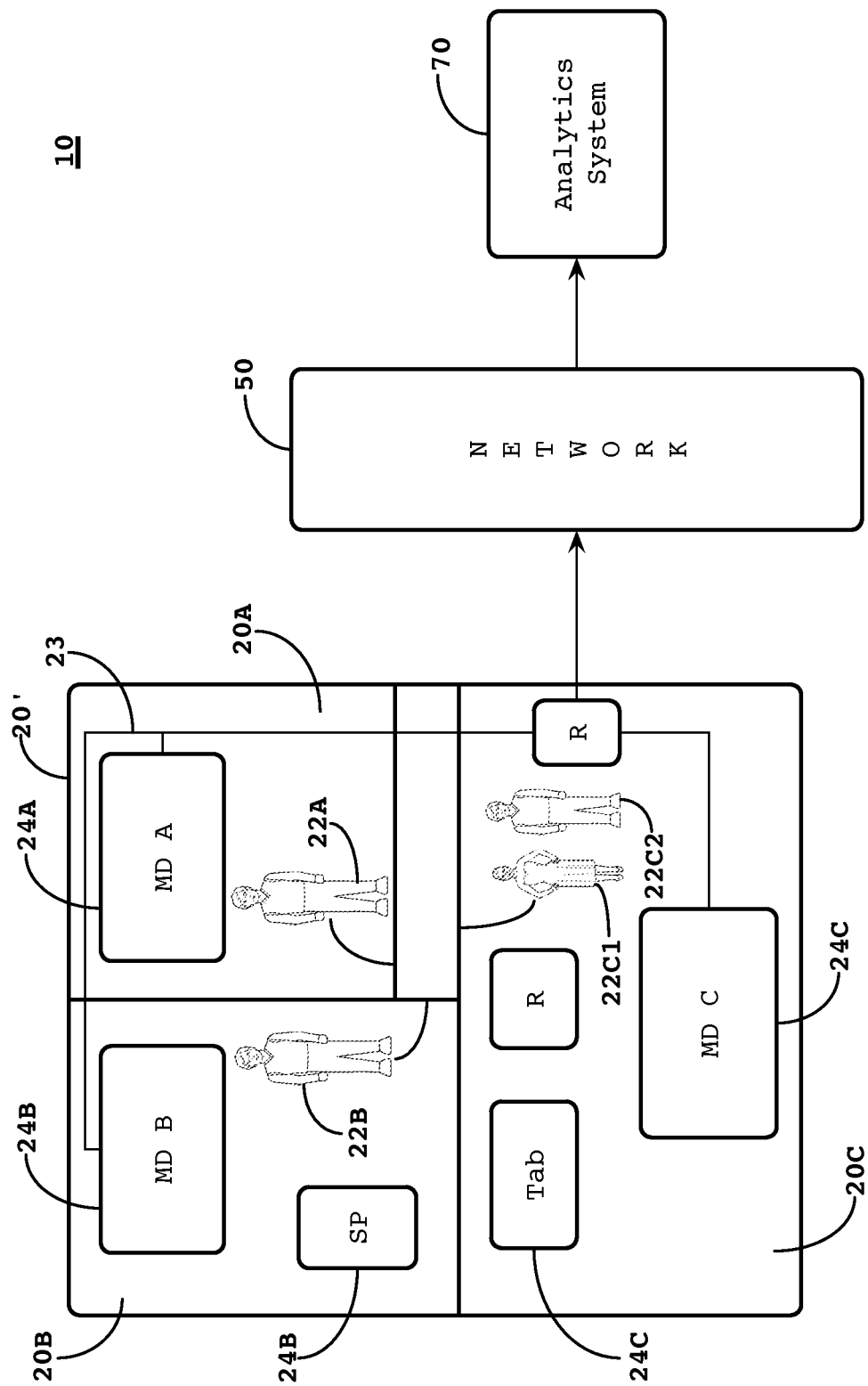

FIGS. 1A-1C illustrate example environments in which viewer presence may be determined and viewer identity verified (authentication) using passive presence and passive and active authentication mechanisms.

FIG. 1A illustrates an example environment in which personal analytics and usage controls may be implemented. In FIG. 1A, system 10 includes viewing locations 20, content provider computing device 40, and service provider computing device 60 (which can also be referred to as a program provider), all of which communicate using communications network 50. Although FIG. 1A shows these entities as separate and apart, at least some of the entities may be combined or related. For example, the content provider computing device 40 and service provider computing device 60 may be part of a single entity. Other combinations of entities are possible.

The viewing location 20 includes first media device 24 and second media device 24 through which viewers 22 are exposed to media from content provider computing device 40 and service provider computing device 60. A viewing location 20 may be the residence of the viewer 22, who operates media devices 24 and 24 to access, through router 25, resources such as Web sites and to receive television programs, radio programs, and other media. The media devices 24 and 24 may be fixed or mobile. For example, media device 24 may be an Internet connected "smart" television (ITV); a "basic" or "smart" television connected to a set top box (STB) or other Internet-enabled device; for example. In an embodiment, the media device 24 includes biometric information capture devices and systems, which are described in detail with respect to FIG. 1B and FIGS. 2A and 2B. Media device 24 may be a tablet, a smart phone, a laptop computer, or a desk top computer, for example. The media devices 24 and 24 may include browsers. A browser may be a software application for retrieving, presenting, and traversing resources such as at the Web sites. The browser may record certain data related to the Web site visits. The media devices 24 and 24 also may include applications. A viewer 22 may cause the media devices 24 or 26 to execute an application, such as a mobile banking application, to access online banking services. The applications may involve use of a browser or other means, including cellular means, to connect to the online banking services.

The viewing location 20 may include a monitor 27 that records and reports data collected during exposure of digital component segments 42 and programs 62 to the viewer 22. The example monitor 27 may be incorporated into router 25 through which certain media (e.g., Internet-based content) received at the viewing location 20 passes.

The content provider computing device 40 operates server 44 to provide digital components that are served with programs 62 provided by the service provider computing device 60. For example, the server 44 may provide digital components to serve with broadcast television programming. The digital component segments 42 may include audio, video, and animation features. The digital component segments 42 may be in a rich media format. The content provider computing device 40 may provide a promotional campaign that includes digital components to be served across different media types or a single media type. The cross-media digital component segments 42 may be complementary; that is, related to the same product or service.

The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the service provider computing device 60 and the media devices 24. While illustrated as a single or continuous network, the network 50 may be divided logically into various sub-nets or virtual networks, so long as at least a portion of the network 50 may facilitate communications among the entities of FIG. 1A.

The service provider computing device 60 delivers programs for consumption by the viewer 22. The programs 62 may be broadcast television programs. Alternately, the programs 62 may be radio programs, Internet Web sites, or any other media. The programs 62 include provisions for serving and displaying digital component segments 42. The service provider computing device 60 may receive the digital component segments 42 from the content provider device 40 and incorporate the digital components into the programs 62. Alternately, the viewer's media devices may request a digital component segment 42 when those media devices display a program 62.

The service provider computing device 60 operates server 66 to serve programs and to implement usage control system 200. The system 200 may collect information related to programs 62 displayed at the media devices 24. The system 200 may provide an interface that allows the viewer 22 to establish usage controls.

FIG. 1B illustrates aspects of the system 10 of FIG. 1A, emphasizing viewer presence and authentication features. In FIG. 1B, media device 24 (an Internet-connect smart television) at viewing location 20 is shown to include camera 305, microphone 306, and audio recognition system 312 and video recognition system 314. Some of these components of the television 24 may form at last a part of a network security appliance 123 whereby viewers at the viewing location 20 may have their presence detected and their identities authenticated. The television 24 receives programming and digital components through gateway 25, and provides measurement data to analytics system 70 through the gateway 25. In an embodiment, the gateway is a router (e.g., router 25 of FIG. 1A). In an aspect, the router 25 may be configured to log certain information related to programs viewed on and digital components served at the television 24. The router 25 may pass this information to the analytics system 70. The router 25 also may pass viewer presence and authentication information to the analytics system 70.

Three viewers 22 are shown at the viewing location 20, each viewing programming on the television 24. The feature extraction and analysis system may obtain certain biometric information about the viewers 22, such as video and audio fingerprint information and use the information to determine, within some confidence level, how many viewers 22 are in front of the television 24, what the identities of the viewers 22 are, which viewer is interacting with the television 24 (e.g., changing channels with a remote control) and other information. Note that any image/audio processing occurs locally, only. Certain aspects of the processed information, but not any viewer images or audio, and no information that may be used to identify a viewer, then may be supplied to the analytics system 70.

FIG. 1C illustrates additional aspects of the system 10 of FIG. 1A. In FIG. 1C, viewing location 20' is shown as a residence of four viewers 22A-22C2. The viewing location 20' includes three separated viewing locations (or rooms) 20A-20C. Each such viewing location has installed therein a fixed media device, or Internet-enabled smart television 24i. In addition to the televisions 24i, the viewing location 20' also includes, in location 20B, smartphone 24B and in viewing location 20C, tablet 24C. All these media devices may be connected, by wired or wireless mechanisms (e.g., signal path 23), to router 25, which in turn is connected to analytics system 70 over network 50.

The televisions 24i each may include components to determine presence and authenticity of the viewers (e.g., the same television components as shown in FIG. 1B). As is clear from FIG. 1C, a viewer in location 20B (e.g., viewer 22B) cannot be viewing the television 24C. Therefore, if the presence and authentication components of television 24C were to indicate the presence of the viewer 22B in the location 20C, that presence indication would be erroneous.

In operation, the televisions 24i of FIG. 1C may detect when a viewer 22 enters or leaves a room, may determine a number of viewers in a room, and may determine which of multiple viewers 22 in a room is operating a task such as issuing orders to the television 24i. Note that the viewers need not be signed-in to the televisions 24i, or to any other media device. The presence and authentication system may operate in a completely passive mode. Alternately, the system may include active features, including active authentication features such as sign-in and password entry. An example of a presence and authentication system, as instantiated locally at the viewing location 20', is described in more detail with respect to FIG. 3.

In executing the processes of FIGS. 1A-1C, and as otherwise disclosed herein, individual viewer and household demographic data, Internet activity, and television viewing data, for example, may be collected and used. In situations in which the systems disclosed herein may collect and/or use personal information about viewers, or may make use of personal information, the viewers may be provided with an opportunity to control whether programs or features collect viewer information (e.g., information about a viewer's social network, social actions or activities, profession, a viewer's preferences, or a viewer's current location), or to control whether and/or how to receive media, including digital components, from an server that may be more relevant or of interest to the viewer. Furthermore, where the control process involves detection of personal features, such as facial features capture through facial recognition) the viewers consent to capture and analysis of the features. In addition, certain data may be treated in one or more ways before it is stored or used, so that personally identifiable information is removed. For example, a viewer's identity may be treated so that no personally identifiable information can be determined for the viewer, or a viewer's geographic location may be generalized where location information is obtained (such as to a city, ZIP code, or state level), so that a particular location of a viewer cannot be determined. Thus, the viewer may have control over how information is collected about the viewer and used by a server.

Figure 1D:
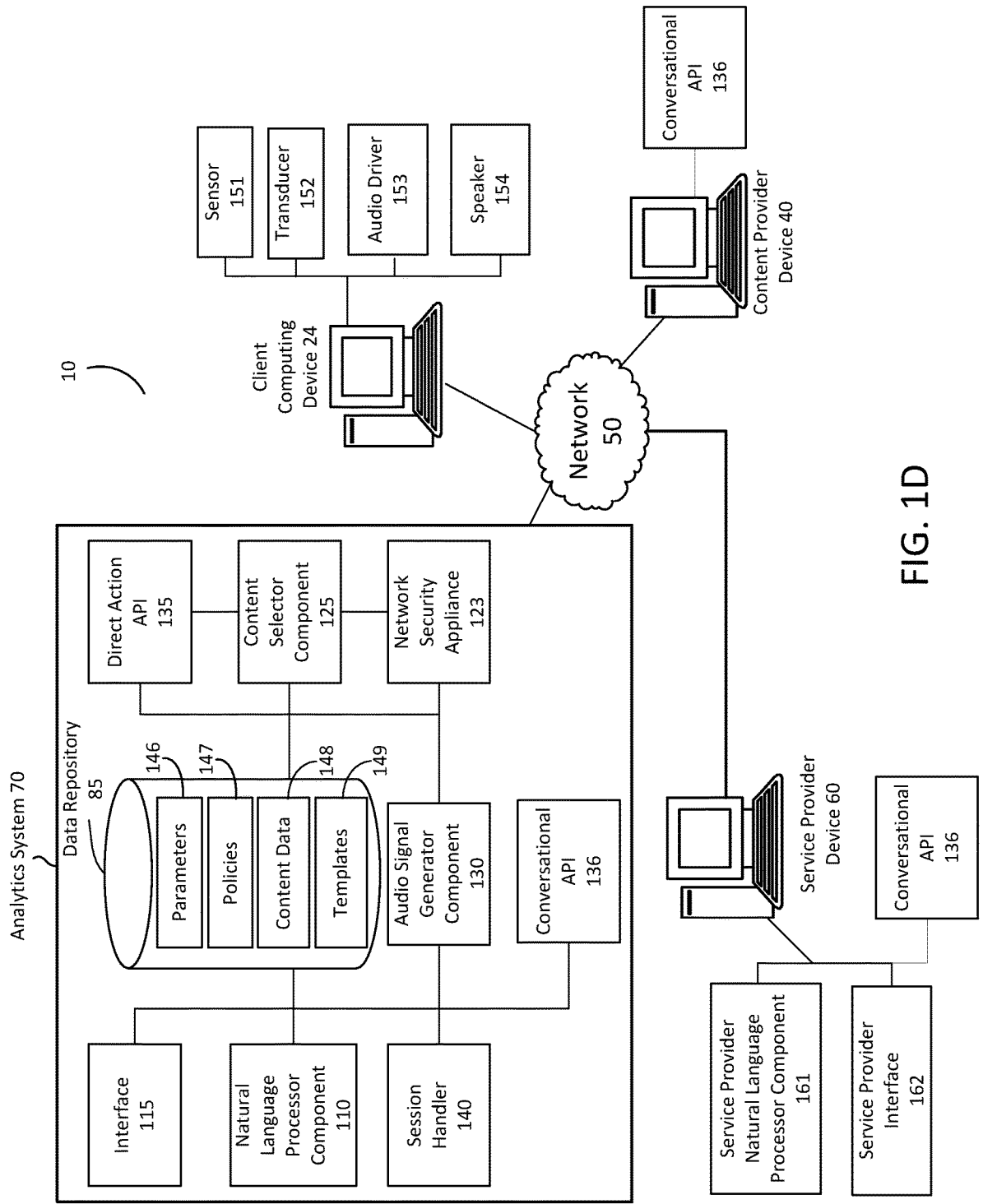
FIG. 1D depicts an example system to perform authentication of packetized audio signals in a voice activated data packet (or other protocol) based computer network environment.

FIG. 1D depicts an example system 10 to perform authentication of packetized audio signals in a voice activated data packet (or other protocol) based computer network environment. The system 10 can include at least one data processing system 70. The data processing system 70 can include at least one server having at least one processor. For example, the data processing system 70 can include a plurality of servers located in at least one data center or server farm. The data processing system 70 can determine from an audio input signal a request and a trigger keyword associated with the request. Based on the request and trigger keyword the data processing system 70 can determine or select a thread that includes a plurality of sequence-dependent operations and can select content items (and initiate other actions as described herein) in an order that does not match the sequence of dependent operations, for example as part of a voice activated communication or planning system. The content items can include one or more audio files that when rendered provide an audio output or acoustic wave. The content items can include other content (e.g., text, video, or image content) in addition to audio content.

The data processing system 70 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous— one or more of the servers or machines can operate according to one or more type of operating system platform. The data processing system 70 can include servers in a data center that are stored in one or more high-density rack systems, along with associated storage systems, located for example in an enterprise data center. The data processing system 70 with consolidated servers in this way can improve system manageability, data security, the physical security of the system, and system performance by locating servers and high-performance storage systems on localized high-performance networks. Centralization of all or some of the data processing system 70 components, including servers and storage systems, and coupling them with advanced system management tools allows more efficient use of server resources, which saves power and processing requirements and reduces bandwidth usage.

The data processing system 70 can include at least one natural language processor (NLP) component 110, at least one interface 115, at least one network security appliance 123, at least one content selector component 125, at least one audio signal generator component 130, at least one direct action application programming interface (API) 135, at least one session handler component 140, at least one conversational or communication API 136, and at least one data repository 85. The network security appliance can also be referred to as an authentication engine. In some implementations, the authentication engine can be a component of the network security appliance. The NLP component 110, interface 115, network security appliance 123, content selector component 125, audio signal generator component 130, direct action API 135, and session handler component 140 can each include at least one processing unit, server, virtual server, circuit, engine, agent, appliance, or other logic device such as programmable logic arrays configured to communicate with the data repository 85 and with other computing devices (e.g., the client computing device 24, the content provider computing device 40, or the service provider computing device 60) via the at least one computer network 50. The network 50 can include computer networks such as the internet, local, wide, metro or other area networks, intranets, satellite networks, other computer networks such as voice or data mobile phone communication networks, and combinations thereof.

The session handler component 140 can establish a communication session between the data processing system 70 and the client computing device 24. The session handler component 140 can generate the communication session based on receiving an input audio signal from the computing device 24. The session handler component 140 can set the initial duration of the communication session base on the time of day, location of the client computing device 24, context of the input audio signal, or a voiceprint. The session handler component 140 can terminate the communication session after expiration of the session. Authentication may only be needed once per communication session. For example, the data processing system 70 can determine that there was a previous successful authentication during the communication session, and not require an additional authentication until after the communication session expires.

The network 50 can include or constitute a display network, e.g., a subset of information resources available on the internet that are associated with a content placement or search engine results system, or that are eligible to include third party content items as part of a content item placement campaign. The network 50 can be used by the data processing system 70 to access information resources such as web pages, web sites, domain names, or uniform resource locators that can be presented, output, rendered, or displayed by the client computing device 24. For example, via the network 50 a user of the client computing device 24 can access information or data provided by the content provider computing device 40 or the service provider computing device 60.

The network 50 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 50 can include a wireless link, such as an infrared channel or satellite band. The topology of the network 50 may include a bus, star, or ring network topology. The network 50 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 24, the content provider computing device 40, and the service provider computing device 60 can each include at least one logic device such as a computing device having a processor to communicate with each other or with the data processing system 70 via the network 50. The client computing device 24, the content provider computing device 40, and the service provider computing device 60 can each include at least one server, processor or memory, or a plurality of computation resources or servers located in at least one data center. The client computing device 24, the content provider computing device 40, and the service provider computing device 60 can each include at least one computing device such as a desktop computer, laptop, tablet, personal digital assistant, smartphone, portable computer, thin client computer, virtual server, or other computing device.

The client computing device 24 can include at least one sensor 151, at least one transducer 152, at least one audio driver 153, and at least one speaker 154. The sensor 151 can include a microphone or audio input sensor. The sensor 151 can also include at least one of a GPS sensor, proximity sensor, ambient light sensor, temperature sensor, motion sensor, accelerometer, or gyroscope. The transducer 152 can convert the audio input into an electronic signal. The audio driver 153 can include a script or program executed by one or more processors of the client computing device 24 to control the sensor 151, the transducer 152 or the audio driver 153, among other components of the client computing device 24 to process audio input or provide audio output. The speaker 154 can transmit the audio output signal.

The client computing device 24 can be associated with an end user that enters voice queries as audio input into the client computing device 24 (via the sensor 151) and receives audio output in the form of a computer-generated voice that can be provided from the data processing system 70 (or the content provider computing device 40 or the service provider computing device 60) to the client computing device 24, output from the speaker 154. The computer-generated voice can include recordings from a real person or computer-generated language.

The content provider computing device 40 can provide audio based content items for display by the client computing device 24 as an audio output content item. The content item can include an offer for a good or service, such as a voice based message that states: "Would you like me to order you a taxi?" For example, the content provider computing device 40 can include memory to store a series of audio content items that can be provided in response to a voice based query. The content provider computing device 40 can also provide audio based content items (or other content items) to the data processing system 70 where they can be stored in the data repository 85. The data processing system 70 can select the audio content items and provide (or instruct the content provider computing device 40 to provide) the audio content items to the client computing device 24. The content can include security questions that are generated to authenticate the user of the client computing device 24. The audio based content items can be exclusively audio or can be combined with text, image, or video data.

The service provider computing device 60 can include at least one service provider natural language processor (NLP) component 161 and at least one service provider interface 162. The service provider NLP component 161 (or other components such as a direct action API of the service provider computing device 60) can engage with the client computing device 24 (via the data processing system 70 or bypassing the data processing system 70) to create a back-and-forth real-time voice or audio based conversation (e.g., a session) between the client computing device 24 and the service provider computing device 60. For example, the service provider interface 162 can receive or provide data messages to the direct action API 135 of the data processing system 70. The service provider computing device 60 and the content provider computing device 40 can be associated with the same entity. For example, the content provider computing device 40 can create, store, or make available content items for a car sharing service, and the service provider computing device 60 can establish a session with the client computing device 24 to arrange for a delivery of a taxi or car of the car share service to pick up the end user of the client computing device 24. The data processing system 70, via the direct action API 135, the NLP component 110 or other components can also establish the session with the client computing device, including or bypassing the service provider computing device 60, to arrange for example for a delivery of a taxi or car of the car share service.

The service provider device 60, the content provider device 40, and the data processing system 70 can include a conversational API 136. The end user can interact, via a voice conversation, with the content items and the data processing system 70 via a communication session. The voice conversation can be between the client device 24 and the conversational API 136. The conversational API 136 can be executed by the data processing system 70, service provider 60, or content provider 40. The data processing system 70 can obtain additional information about the end user's interaction with the content directly when the data processing system executes the conversational API 136. When the service provider 60 or content provider provide 155 execute the conversational API 136, the communication session can either be routed through the data processing system 70, or the respective entities can forward data packets of the communication session to the data processing system 70. The networking security appliance described herein can terminate the communication session when the conversational API 136 is executed by the data processing system 70. The networking security appliance 70 can send instructions to the service provider 60 or content provider 40 to terminate (or otherwise disable) the communication session when the service provider 60 or content provider 40 execute the conversational API 136.

The data repository 85 can include one or more local or distributed databases and can include a database management system. The data repository 85 can include computer data storage or memory and can store one or more parameters 146, one or more policies 147, content data 148, or templates 149 among other data. The parameters 146, policies 147, and templates 149 can include information such as rules about a voice based session between the client computing device 24 and the data processing system 70 (or the service provider computing device 60). The content data 148 can include content items for audio output or associated metadata, as well as input audio messages that can be part of one or more communication sessions with the client computing device 24.

The data processing system 70 can include an application, script or program installed at the client computing device 24, such as an app to communicate input audio signals to the interface 115 of the data processing system 70 and to drive components of the client computing device to render output audio signals. The data processing system 70 can receive data packets or other signals that include or identify an audio input signal. For example, the data processing system 70 can execute or run the NLP component 110 to receive the audio input signal. The audio input signal can be detected by the sensor 151 (e.g., a microphone) of the client computing device. The NLP component 110 can convert audio input signal into recognized text by comparing the input signal against a stored, representative set of audio waveforms and choosing the closest matches. The representative waveforms can be generated across a large set of input signals. The user can provide some of the input signals. Once the audio signal is converted into recognized text, the NLP component 110 can match the text to words that are associated, for example via a learning phase, with actions that the system 100 can make. Via the transducer 152, the audio driver 153, or other components, the client computing device 24 can provide the audio input signal to the data processing system 70 (e.g., via the network 50) where it can be received (e.g., by the interface 115) and provided to the NLP component 110 or stored in the data repository 85 as content data 148.

The NLP component 110 can obtain the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express intent for transport; however, the trigger keyword indicates that transport is an ancillary action to at least one other action that is indicated by the request.

The content selector component 125 can obtain this information from the data repository 85, where it can be stored as part of the content data 148. The content selector component 125 can query the data repository 85 to select or otherwise identify the content item, e.g., from the content data 148. The content selector component 125 can also select the content item from the content provider computing device 40. For example, responsive to a query received from the data processing system 70, the content provider computing device 40 can provide a content item to the data processing system 70 (or component thereof) for eventual output by the client computing device 24.

The audio signal generator component 130 can generate or otherwise obtain an output signal that includes the content item. For example, the data processing system 70 can execute the audio signal generator component to generate or create an output signal corresponding to the content item. The interface 115 of the data processing system 70 can provide or transmit one or more data packets that include the output signal via the computer network 50 to the client computing device 24. For example, the data processing system 70 can provide the output signal from the data repository 85 or from the audio signal generator component 130 to the client computing device 24. The data processing system 70 can also instruct, via data packet transmissions, the content provider computing device 40 or the service provider computing device 60 to provide the output signal to the client computing device 24. The output signal can be obtained, generated, transformed to or transmitted as one or more data packets (or other communications protocol) from the data processing system 70 (or other computing device) to the client computing device 24.

The content selector component 125 can select the content item for the action of the input audio signal as part of a real-time content selection process. For example, the content item can be provided to the client computing device for transmission as audio output in a conversational manner in direct response to the input audio signal. The real-time content selection process to identify the content item and provide the content item to the client computing device 24 can occur within one minute or less from the time of the input audio signal and be considered real-time.

The output signal that corresponds to the content item, for example, an output signal that was obtained or generated by the audio signal generator component 130 transmitted via the interface 115 and the computer network 50 to the client computing device 24, can cause the client computing device 24 to execute the audio driver 153 to drive the speaker 154 to generate an acoustic wave corresponding to the output signal. The acoustic wave can include words of or corresponding to the content item.

The direct action API 135 of the data processing system can generate based on the trigger keyword, action data structures. The direct action API 135 can execute a specified action to satisfy the end user's intention, as determined by the data processing system 70. Depending on the action specified in its inputs, the direct action API 135 can execute code or a dialog script that identifies the parameters required to fulfill a user request. The action data structures can be generated responsive to the request. The action data structure can be included in the messages that are transmitted to or received by the service provider computing device 60. Based on the request parsed by the NLP component 110, the direct action API 135 can determine to which of the service provider computing devices 60 the message should be sent. For example, if an input audio signal includes "order a taxi," the NLP component 110 can identify the trigger word "order" and the request for a taxi. The direct action API 135 can package the request into an action data structure for transmission as a message to a service provider computing device 60 of a taxi service. The message can also be passed to the content selector component 125. The action data structure can include information for completing the request. In this example, the information can include a pick up location and a destination location. The direct action API 135 can retrieve a template 149 from the repository 85 to determine which fields to include in the action data structure. The direct action API 135 can determine necessary parameters and can package the information into an action data structure. The direct action API 135 can retrieve content from the repository 85 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_deviceIdentifier; authentication_credentials; pick_ up_location; destination_location; no_passengers; service_level}. The action data structure can then be sent to another component such as the content selector component 125 or to the service provider computing device 60 to be fulfilled.

The direct action API 135 can communicate with the service provider computing device 60 (that can be associated with the content item, such as a car share company) to order a taxi or ride share vehicle for the location of the movie theater at the time the movie ends. The data processing system 70 can obtain this location or time information as part of the data packet (or other protocol) based data message communication with the client computing device 24, from the data repository 85, or from other sources such as the service provider computing device 60 or the content provider computing device 40. Confirmation of this order (or other conversion) can be provided as an audio communication from the data processing system 70 to the client computing device 24 in the form of an output signal from the data processing system 70 that drives the client computing device 24 to render audio output such as, "great, you will have a car waiting for you at 11 pm outside the theater." The data processing system 70, via the direct action API 135, can communicate with the service provider computing device 60 to confirm the order for the car.

The data processing system 70 can obtain the response (e.g., "yes please") to the content item ("would you like a ride home from the movie theater?") and can route a packet based data message to the service provider NLP component 161 (or other component of the service provider computing device). This packet based data message can cause the service provider computing device 60 to effect a conversion, e.g., to make a car pick up reservation outside the movie theater. This conversion—or confirmed order—(or any other conversion of any other action of the thread) can occur prior to completion of one or more actions of the thread, such as prior to completion of the movie, as well as subsequent to completion of one or more actions of the thread, such as subsequent to dinner.

The direct action API 135 can obtain content data 148 (or parameters 146 or policies 147) from the data repository 85, as well as data received with end user consent from the client computing device 24 to determine location, time, user accounts, logistical or other information in order to reserve a car from the car share service. The content data 148 (or parameters 146 or policies 147) can be included in the action data structure. When the content included in the action data structure includes end user data that is used for authentication, the data can be passed through a hashing function before being stored in the data repository 85. Using the direct action API 135, the data processing system 70 can also communicate with the service provider computing device 60 to complete the conversion by, in this example, making the car share pick up reservation.

The data processing system 70 can cancel actions associated with content items. The cancellation of the actions can be in response to the network security appliance 123 generating an alarm condition. The network security appliance 123 can generate an alarm condition when the network security appliance 123 predicts that the input audio signal is malicious or otherwise not provided by an authorized end user of the client computing device 24.

The data processing system 70 can include, interface, or otherwise communicate with a network security appliance 123. The network security appliance 123 can authenticate signal transmissions between the client computing device 24 and the content provider computing device 40. The signal transmissions can be the audio inputs from the client computing device 24 and the audio response signals from the client computing device 24. The audio response signals can be generated in response to content items transmitted to the client computing device 24 by the data processing system 70 during one or more communication sessions. The network security appliance 123 can authenticate the signal transmission by comparing the action data structure to one or more characteristics of the input audio signals and response audio signals.

The network security appliance 123 can determine characteristics of the input audio signal. The characteristics of the audio signal can include voiceprint, a keyword, a number of voices detected, an identification of an audio source, and a location of an audio source. For example, the network security appliance 123 can measure the spectral components of the input audio signal to generate a voiceprint of the voice used to generate the input audio signal. The voiceprint generated in response to the input audio signal can be compared to a stored voiceprint saved by the data processing system 70. The saved voiceprint can be an authenticated voiceprint—for example, a voiceprint generated by an authenticated user of the client computing device 24 during a setup phase of the system.

The network security appliance 123 can also determine non-audio characteristics of the input audio signal. The client computing device 24 can include non-audio information in the input audio signal. The non-audio information can be a location as determined or indicated by the client computing device 24. The non-audio information can include a client computing device identifier. Non-audio characteristics or information can also include physical authentication devices such as challenge-response with a one-time password device or a fingerprint reader.

The network security appliance 123 can set an alarm condition when the characteristics of the input audio signal do not correspond to the action data structure. For example, the network security appliance 123 can detect mismatches between the action data structure and the characteristics of the input audio signal. In one example, the input audio signal can include a location of the client computing device 24. The action data structure can include a predicted location of the end user, such as a location based on the end user's smartphone's general location. If the network security appliance 123 determines that the location of the client computing device 24 is not within a predefined range of the location included in the action data structure, the network security appliance 123 can set an alarm condition. In another example, the network security appliance 123 can compare the voiceprint of the input audio signal to a voiceprint of the end user stored in the data repository 85 and included in the action data structure. If the two voiceprints do not match, the network security appliance 123 can set an alarm condition.

The network security appliance 123 can determine which input audio signal characteristics to base the authentication on responsive to the request in the input audio signal. Authentication with the different characteristics can have different computational requirements. For example, comparing voiceprints can be computationally more intensive than comparing two locations. Selecting authentication methods that are computationally intensive when not called for can be computationally wasteful. The network security appliance 123 can improve the efficiency of the data processing system 70 by selecting the characteristics used for authentication based on the request. For example, when the security risk associated with the input audio signal is low, the network security appliance 123 can select an authentication method using a characteristic that is not computationally intensive. The network security appliance 123 can select the characteristic based on the cost required to complete the request. For example, a voiceprint characteristic can be used when the input audio signal is "order a new laptop computer," but select a location characteristic when the input audio signal is "order a taxi." The selection of the characteristic can be based on the time or computational intensity required to complete the request. Characteristics that consume more computational resources can be used to authenticate input audio signals that generate requests that take more computational resources to complete. For example, the input audio signal is "Ok, I'd like to go to dinner and the movies" can include multiple actions and requests and involve multiple service providers 60. The input audio signal can generate requests to search for possible movies, search for possible restaurant availability, make restaurant reservations, and purchase movie tickets. The completion of this input audio signal is both computationally more intensive and takes longer to complete than the input audio signal "Ok, what time is it?"

The network security appliance 123 can also set an alarm condition based on the request included in the input audio signal. The network security appliance 123 can automatically set an alarm condition if transmission of the action data structure to a service provider computing device 60 can result in a monetary charge to the end user of the client computing device 24. For example, a first input audio signal "Ok, order a pizza" can generate a monetary charge while a second input audio signal "Ok, what time is it" does not. In this example, the network security appliance 123 can automatically set an alarm condition upon receiving an action data structure corresponding to the first input audio signal and not set an alarm condition up receiving an action data structure corresponding to the second input audio signal.

The network security appliance 123 can set an alarm condition based on the determination the action data structure is intended for a specific service provider device 60. For example, the end user of the client computing device 24 can set restrictions on which service providers the data processing system 70 can interact with on the end user's behalf without further authorization. For example, if the end user has a child, to prevent the child from purchasing toys through a service provider that sells toys, the end user can set a restriction that action data structures cannot be transmitted to the toy seller without further authentication. When the network security appliance 123 receives an action data structure intended for a specific service provider device 60, the network security appliance 123 can look up a policy in the data repository to determine if an alarm condition should automatically be set.

The network security appliance 123 can send indications of the alarm condition to the content selector component 125. The content selector component 125 can select a content item to transmit to the client computing device 24. The content item can be an auditory request for a passphrase or additional information to authenticate the input audio signal. The content item can be transmitted to the client computing device 24, where the audio driver 153 converts the content item into sound waves via the transducer 152. The client computing device 24 end user can respond to the content item. The end user's response can be digitized by the sensor 151 and transmitted to the data processing system 70. The NLP component 110 can process the response audio signal and provide the response to the network security appliance 123. The network security appliance 123 can compare a characteristic of the response audio signal with a characteristic of the input audio signal or the action data structure. For example, the content item can be a request for a passphrase. The NLP component 110 can recognize the text of the response audio signal and pass the text to the network security appliance 123. The network security appliance 123 can run a hash function on the text. Having been hashed with the same hashing function, the end user's authenticated passphrase can be saved in the data repository 85. The network security appliance 123 can compare the hashed text with the save, hashed passphrase. If the hashed text and hashed passphrase match, the network security appliance 123 can authenticate the input audio signal. If the hashed text and the hashed pass phase do not match, the network security appliance 123 can set a second alarm condition.

The network security appliance 123 can terminate communication sessions. The network security appliance 123 can transmit instructions to a service provider computing device 60 to disable, pause, or otherwise terminate a communication session established with the client computing device 24. The termination of the communication session can be responsive to the network security appliance 123 setting a second alarm condition. The network security appliance 123 can disable the computing device's ability to generate communication sessions via the data processing system 70 with a service provider computing device 60. For example, if the network security appliance 123 sets a second alarm condition responsive to the input audio signal "Ok, order a taxi," the network security appliance 123 can disable the ability of communication sessions to be established between the client computing device 24 and the taxi service provider device. An authorized user can reauthorize the taxi service provider device at a later time.

Figure 2A:
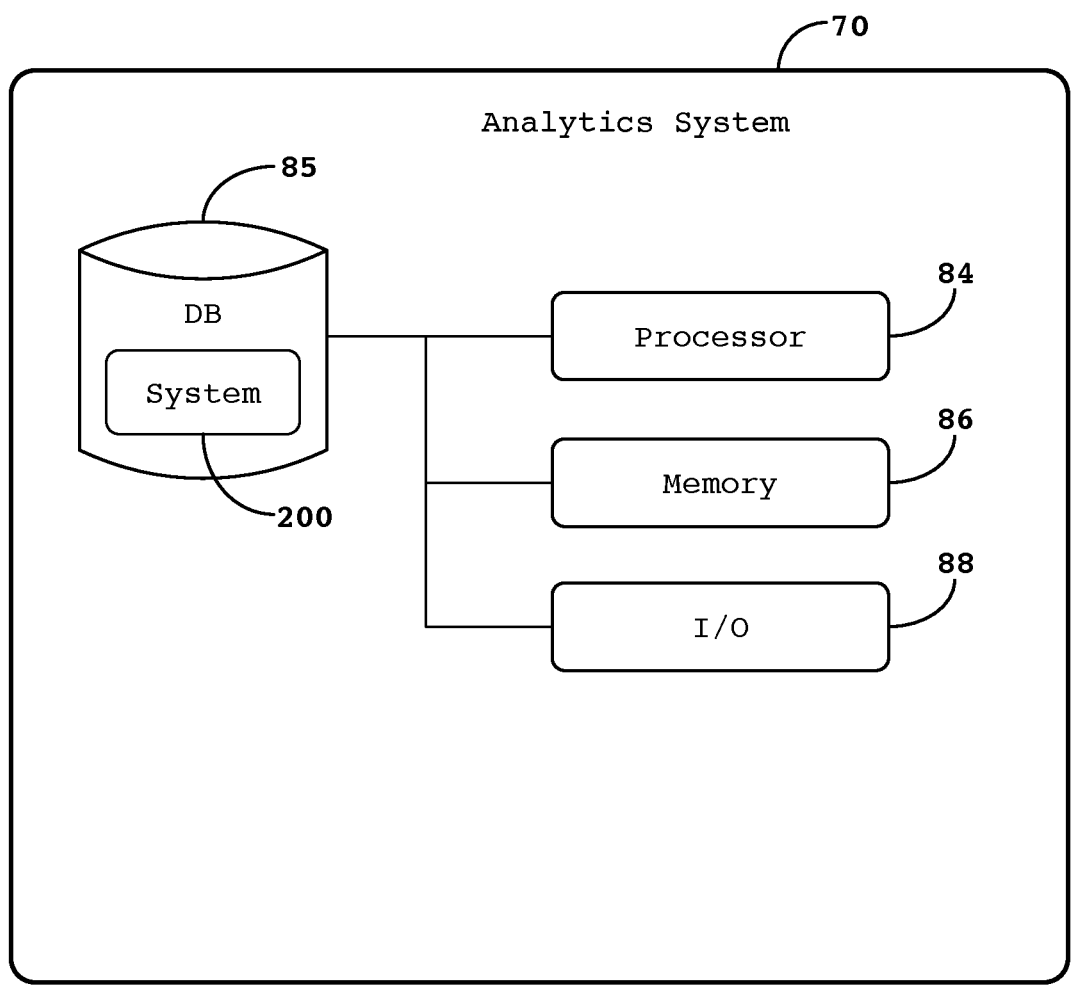
FIGS. 2A and 2B illustrate an example server-side measurement system that determines or uses presence and authentication information.

FIG. 2A illustrates an example measurement system instantiated on analytics system 70. The system includes processor 84, memory 86, input/output 88, and database 85. The database 85 may be a non-transitory computer-readable storage medium having encoded thereon measurement system 200. The processor 84 loads the machine instructions into memory 86 and execute the machine instructions to provide personal analytics and usage controls functions. The I/O 88 allows the analytics system 70 to communicate with other entities such as the server 44.

The system 200 may, in an embodiment, perform feature extraction and analysis processes to determine the presence and authenticity of viewers at a viewing location such as the location 20' of FIG. 1C.

Figure 2B:
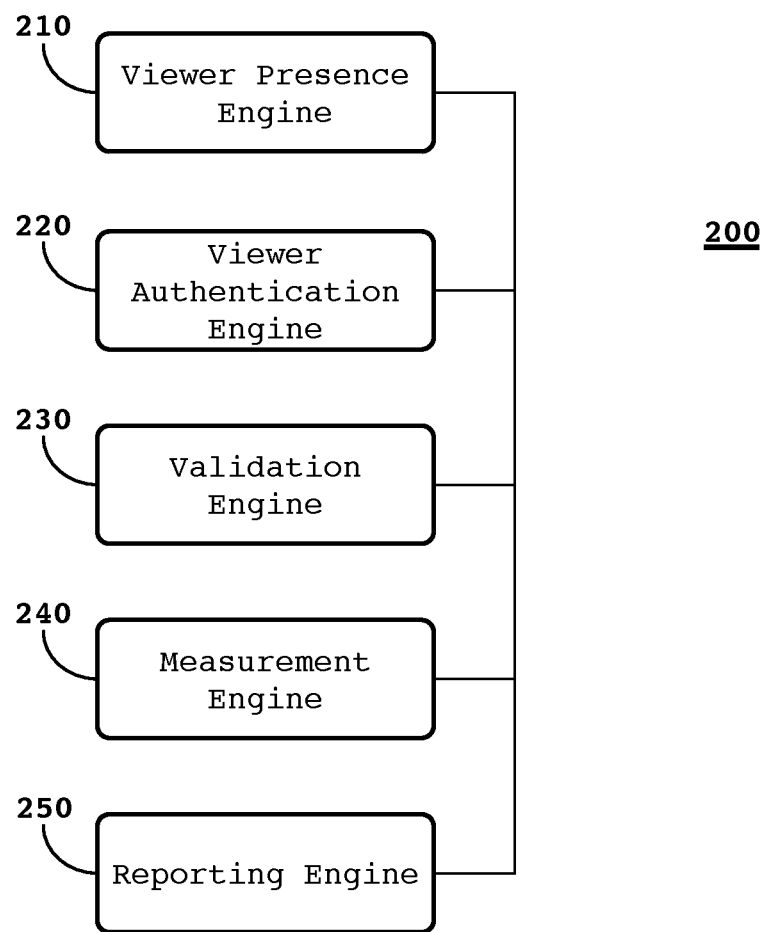

FIG. 2B illustrates example components of a media measurement system 200, implemented on the analytics system 70 of FIG. 2A. In FIG. 2B, system 200 includes viewer presence engine 210, viewer network security appliance 220, validation engine 230, measurement engine 240, and reporting engine 250. The viewer presence engine 210 and the viewer network security appliance 220 may receive summary information.

The validation engine 230 may, based on the presence and authentication information generated locally, determine that the confidence level of the information is sufficient to use in measurement analysis. For example, if the confidence level is 90 percent or higher, the validation engine 230 may allow use of the data in performing media measurements.

The measurement engine 240 determines various media consumption metrics such as reach, incremental reach, TRP, and other media consumption metrics. The repotting engine 250 may repots the media consumption metrics to interested parties such as the content provider computing device 40 and program provider of FIG. 1C.

Figure 3:
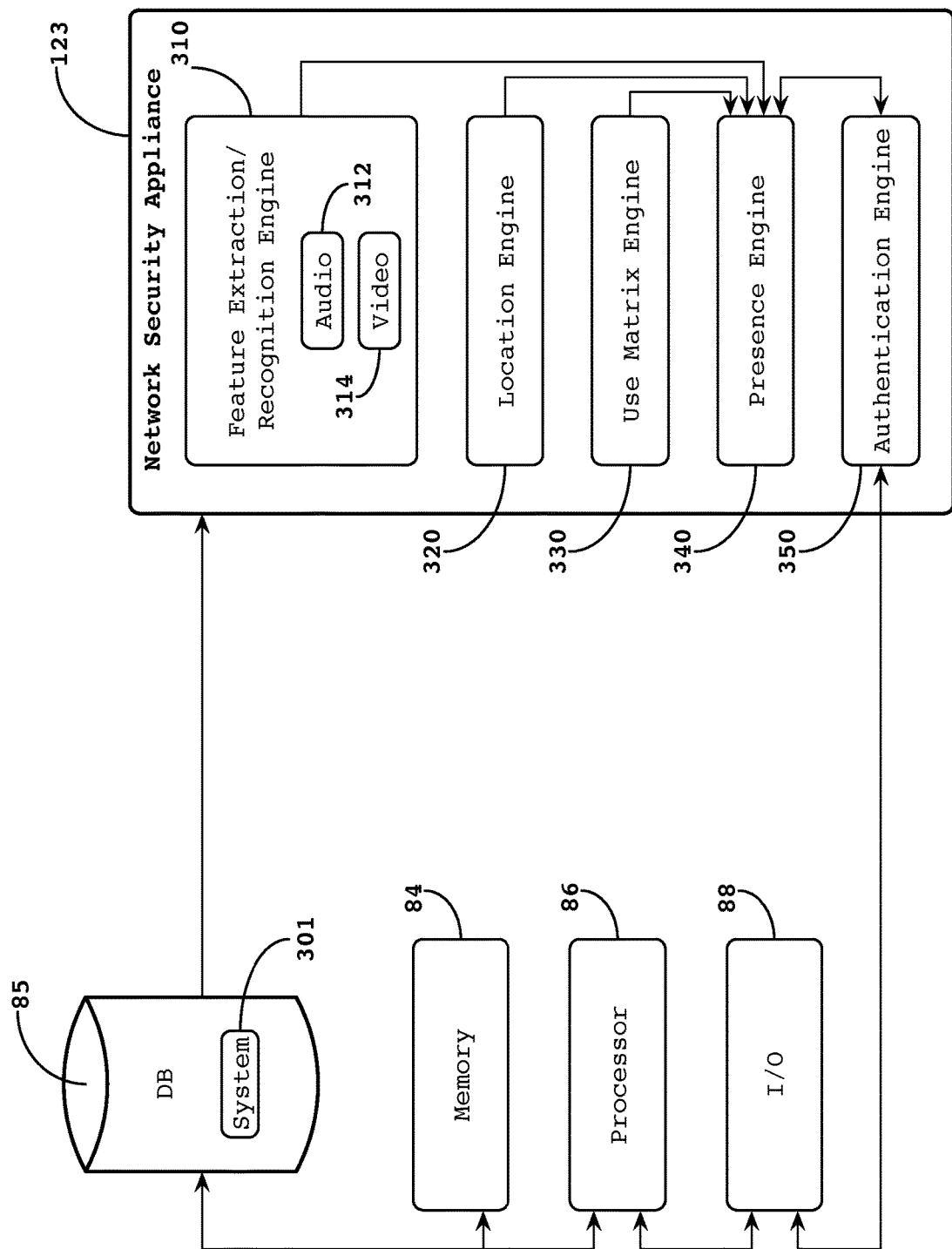
FIG. 3 illustrates and example client-side system that determines the presence and authentication of a viewer.

FIG. 3 illustrates an example of network security appliance 123 that may be installed or implemented on a television 24. In some implementations, the network security appliance 123 or components thereof are executed by the data processing system 70. The components 24' include database 301, memory 84, processor 86, and I/O 88.

The database 301 includes a non-transitory computer-readable storage medium on which is encoded system 300. The system 300 may be loaded into memory 84 and executed by processor 86. I/O may be used for man-machine communications between a viewer 22 and the processor 86. The processor 86 also receives inputs (raw or processed data) from the camera 305 and the microphone 306.

The network security appliance 123 includes feature extraction/recognition engine 310, location engine 320, use matrix engine 330, presence engine 340, and network security appliance 350.

The engine 310 includes audio module 312 and video module 314. The audio module 312 receives raw or processed audio data captured by the microphone 306 and produces a voice fingerprint, which is provided to the presence engine 340. The video module 314 receives raw or processed video data captured by the camera 305 and produces a video fingerprint, which is provided to the presence engine 340.

The location engine 320 may receive location information related to one or more of the viewers 22i(see FIG. 1C). For example, viewer 22C1 may be determined to be operating tablet 24C, either because the viewer 22C1 has logged on to a tablet service, or because a camera in the television 24C has detected a viewer operating a tablet. Other mechanisms for locating the tablet 24C may be used. The tablet 24C may be geo-located by, for example, a GPS system, which may locate the tablet 24C to the specific viewing location (room) 20C, or at least to the larger, overall viewing location 20'. Any location information for a viewer may be passed to the presence engine 340.

The use matrix engine 330 constructs a three-dimensional use matrix considering an initial condition of media devices and viewers at the viewing location 20'. That is, the matrix would show the location of each media device in each room, and the location of each viewer in each room. The engine 330 may update the matrix as the number and identity of media devices in the viewing location 20' changes, and as viewers come and go (both on a semi-permanent basis). The engine 330 then may populate the latest iteration of the matrix to reflect real time positioning of media devices and viewers as best determined by the engines 310 and 320. For example, the engine 330 may populate the matrix with values corresponding to the arrangement of media devices and viewers shown in FIG. 1C. The engine 330 then makes the populated matrix available to the presence engine 340.

The presence engine 340 determines a probability that a particular viewer and a particular media device are in a specific vroom based on its received inputs. For example, the probability that television 24C is in room 20C is 100 percent, but the probability that the viewer 22C1 is in room 20C may be ⅓or greater (assuming the viewer 22C1 is in the viewing location 20' at all). The probability that the viewer 22C1 is in room 20C may be increase based on audio and video fingerprint information received from the engine 310 and location information received from the engine 320.

The presence engine 340 may, when multiple viewers are present, not be able to distinguish between the multiple viewers. In that case, the engine 340 may report the presence of multiple viewers. However, if, for example, viewer 22B was known with a 90 percent confidence level, to be in room 20B, the engine 340 could use this information to better indicate the composition of the viewers in room 20C (e.g., possibly viewers 22A, 22C1, 22C2; not viewer 22B).

The presence engine 340 may provide the presence information to the analytics system 70 and to the network security appliance 350.

The network security appliance 350 may provide for passive and active authentication processes. For example, the engine 350, knowing that viewer 22A is short, might receive from the presence engine 340 a video fingerprint conforming to the shape and size of a short person. In addition, the engine 350 may receive a voice fingerprint conforming to the specific voice patterns of the viewer 22A. By this and other cross-validation processes, the engine 350 may passively authenticate the identity of viewers 22 at the viewing location 20'.

The network security appliance 350 also may provide active authentication functions, such as requesting and/or receiving a viewer sign on by viewer identification and password entry, for example.

Figure 4:
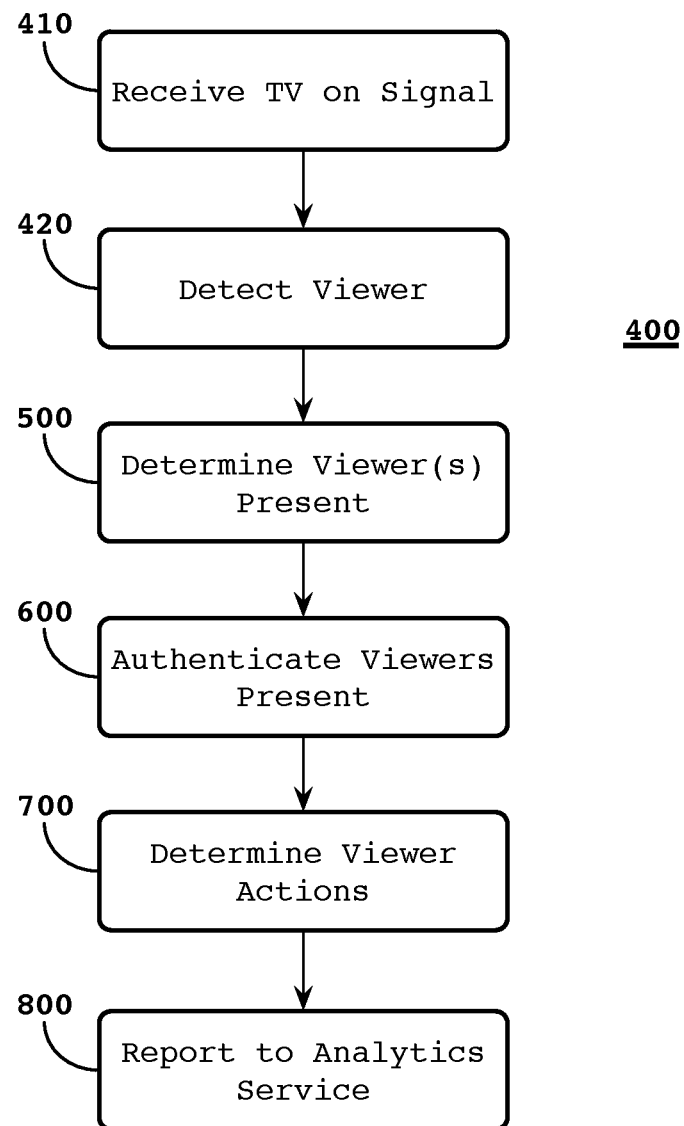
FIGS. 4-8 are flowcharts illustrating example viewer presence and authentication processes as executed by the systems described herein.

FIGS. 4-8 are flowcharts illustrating example viewer presence and authentication processes as executed by the systems described herein. FIG. 4 provides an overview of the method 400 for authenticating users. The method 400 includes receiving a TV signal (ACT 410).

The method 400 includes detecting a viewer (ACT 420). The method 400 includes determining that a viewer is present (ACT 500). The method 400 includes authenticating the viewers present (ACT 600). The method 400 includes determining viewer actions (ACT 700). The method 400 includes reporting to the analytics service (ACT 800).

Figure 5A:
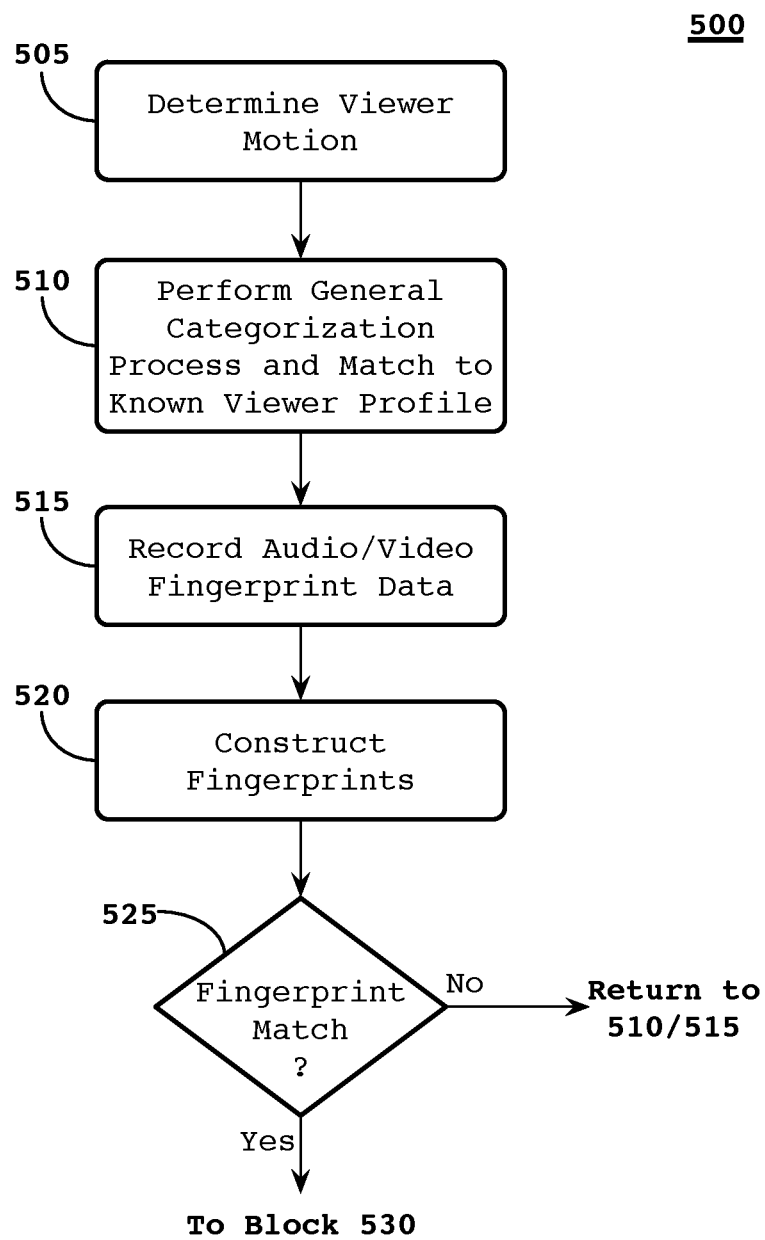
Figure 5B:
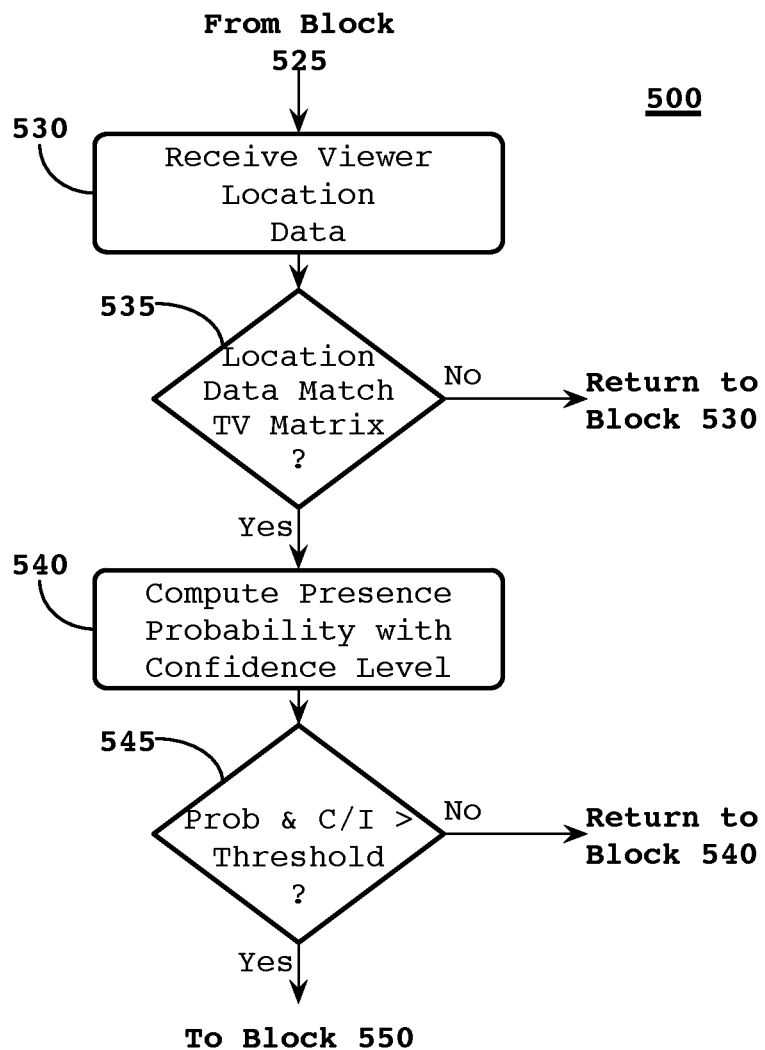
Figure 5C:
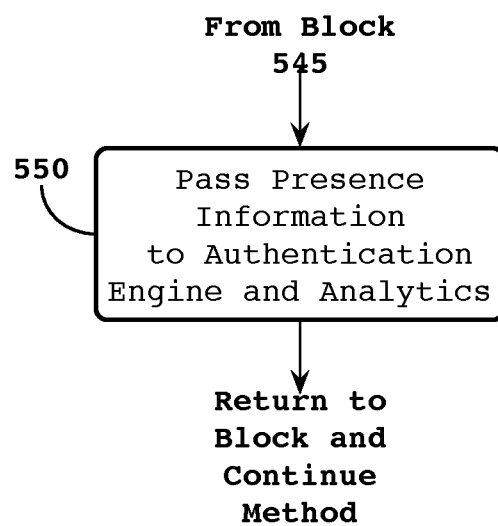

FIGS. 5A, 5B, and 5C provider further detail regarding the step of determining if viewers are present (ACT 500). The subACTS of ACT 500 can include determining viewer motion (ACT 505). The ACT 500 can include performing a general categorization process to match the viewer to a known viewer profile (ACT 510). The ACT 500 can include recording video or audio data to generate fingerprint data (ACT 515). The ACT 500 can include constructing fingerprints (ACT 520). If, at ACT 525, a finger print match is found, the process can continue to ACT 530. If no match is found, the processes can return to ACT 510 or ACT 515. The ACT 500 can include receiving viewer location data (ACT 53). If at ACT 535, the location data matches the TV matrix, the system can computer the presence probability with a confidence interval (ACT 540). If the confidence interval is above a threshold at ACT 545, the ACT 500 can include passing the presence information to an authentication engine (ACT 550).

Figure 6:
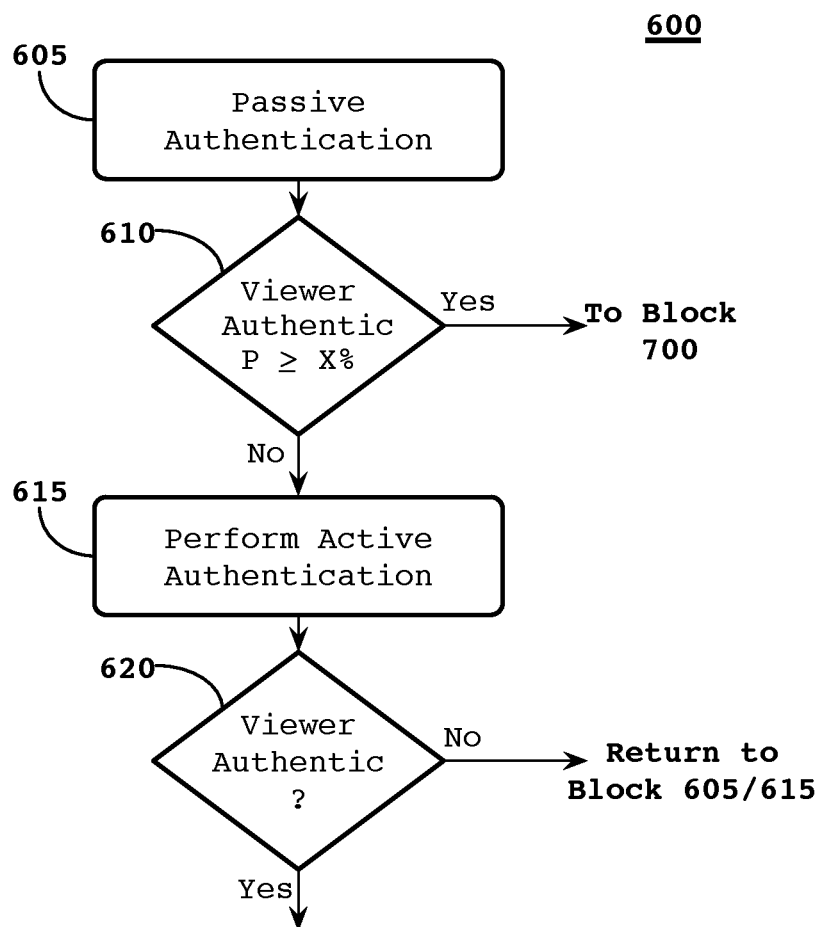

FIG. 6 illustrates further details of ACT 600. The ACT 600 can include performing passive authentication (ACT 605). If, at ACT 610, the viewer authentication is low, the system can perform active authentication (ACT 615). The system can then determine the viewer is authentic based on the active authentication (ACT 620).

Figure 7:
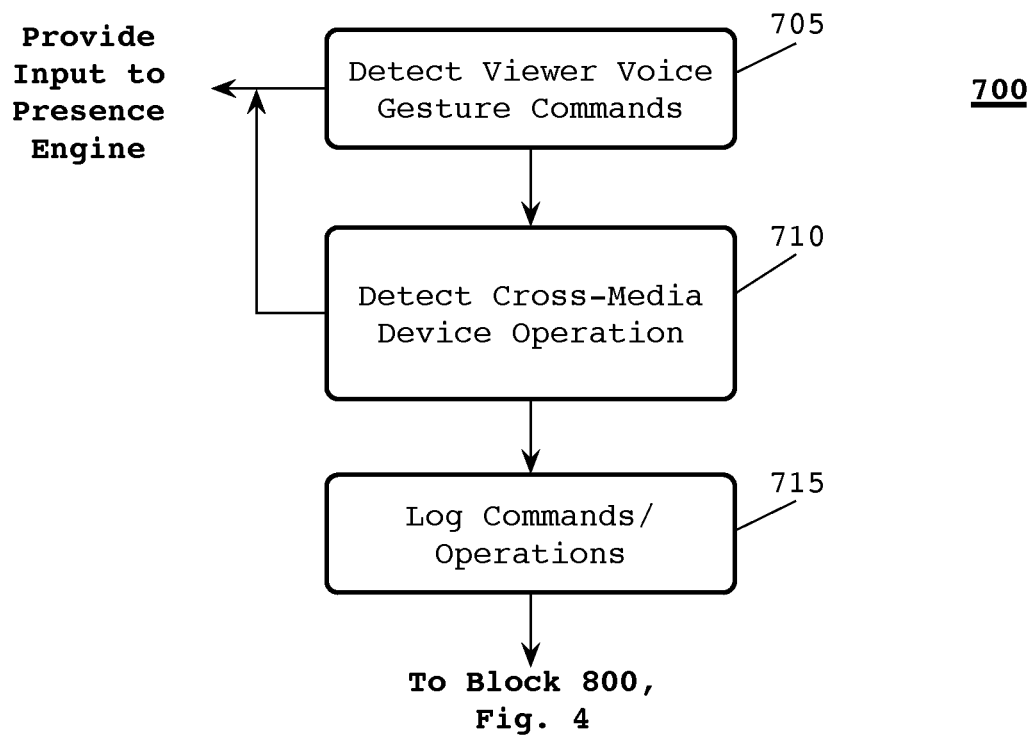

FIG. 7 illustrates further details of ACT 700. The ACT 700 can include detecting viewer voice or gesture commands (ACT 705). The ACT 700 can include detecting cross-media device operations (ACT 710). The ACT 700 can include logging the commands or operations (ACT 715).

Figure 8:
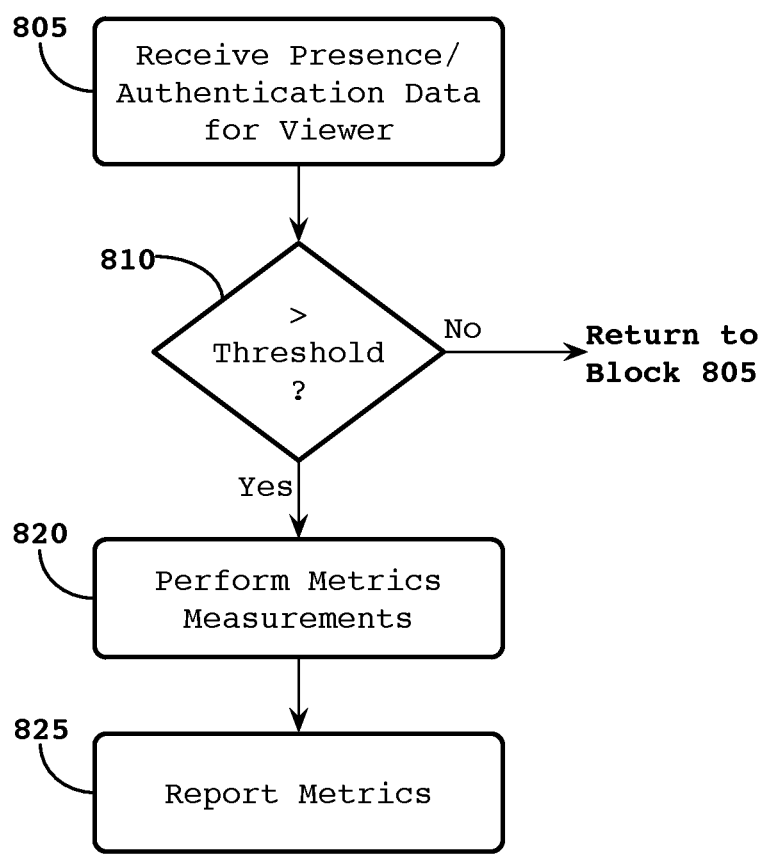

FIG. 8 illustrates further details of ACT 800. The ACT 800 can include receiving presence and authentication data (ACT 805). If, at ACT 810, the data is above a threshold, the system can perform metric measurements (ACT 820). The system can then report the metrics (ACT 825).

Figure 9:
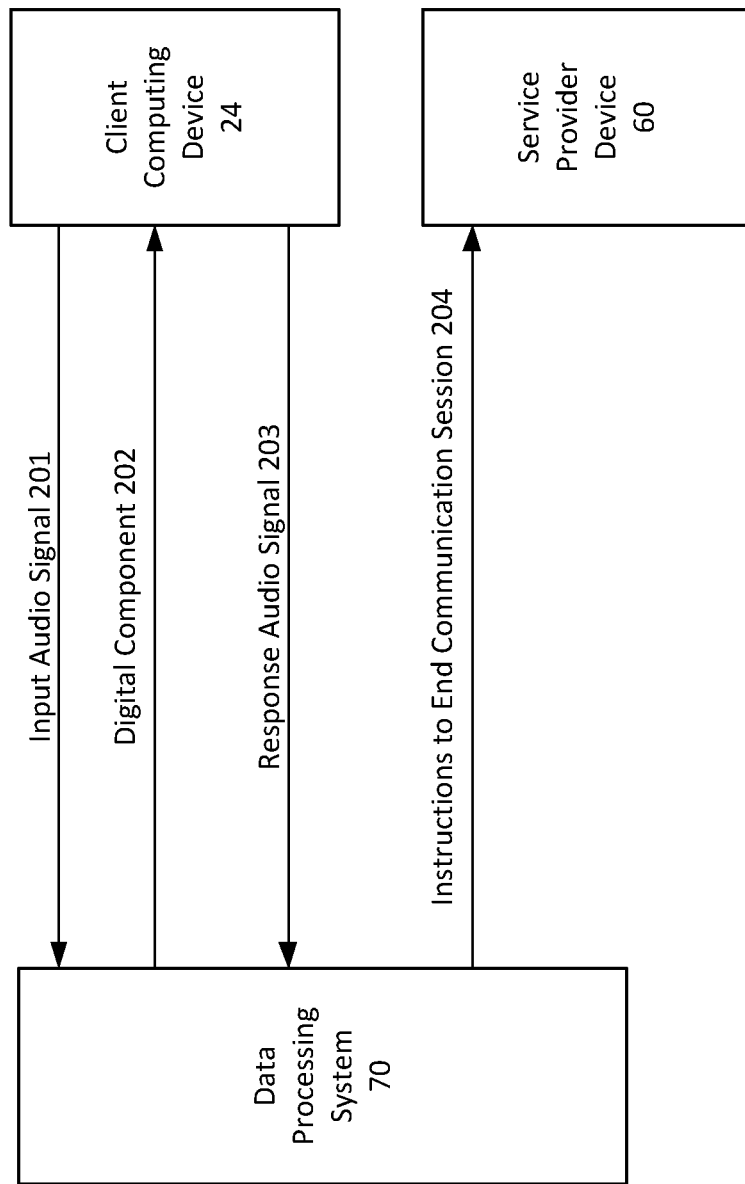
FIG. 9 illustrates a flow diagram illustrating an example operation of a system to perform authentication of packetized audio signals.

FIG. 9 illustrates a flow diagram illustrating an example operation of a system 10 to perform authentication of audio signals. The system 10 can include one or more of the components or elements described above in relation to system 10. For example, the system 10 can include a data processing system 70 that is in communication with a client computing device 24 and a service provider computing device 60, via, for example, the network 50.

The operation of the system 10 can begin with the client computing device 24 transmitting an input audio signal 201 to the data processing system 70. Once the data processing system 70 receives the input audio signal, the NLP component 110 of the data processing system 70 can parse the input audio signal into a request and a trigger keyword that corresponds to the request. A communication session can be established between the client computing device 24 and the service provider computing device 60, via the data processing system 70.

The direct action API 135 can generate an action data structure based on the request. For example, the input audio signal can be "I want a ride to the movies." In this example, the direct action API 135 can determine the request is for a car service. The direct action API 135 can determine the current location of the client computing device 24 that generated the input audio signal and can determine the location of the nearest movie theater. The direct action API 135 can generate an action data structure that includes the location of the client computing device 24 as the pickup location for the car service and includes the location of the nearest movie theater as the destination of the car service. The action data structure can also include one or more characteristics of the input audio signal. The data processing system 70 can pass the action data structure to the network security appliance to determine whether an alarm condition should be set.

If the network security appliance detects an alarm condition, the data processing system 70 can select, via the content selector component 125, a content item. The data processing system 70 can provide the digital component 202 to the client computing device 24. The content item 202 can be provided to the client computing device 24 as part of a communication session between the data processing system 70 and the client computing device 24. The communication session can have the flow and feel of a real-time person to person conversation. For example, the content item can include audio signal that are played at the client computing device 24. The end user can respond to the audio signal, which can be digitized by the sensor 151 and transmitted to the data processing system 70. The content item can be a security question, content item, or other question that is transmitted to the client computing device 24. The question can be presented, via the transducer 152, to the end user that generated the input audio signal. In some implementations, the security question can be based on past interaction between the client computing device 24 and the data processing system 70. For example, if prior to the transmission of input audio signal, the user ordered a pizza via the system 10 by providing the input audio signal of "Ok, order a pizza," the security questions could include "what did you order for dinner last night." The content item can also include a request for a password to be provided to the data processing system 70. The content item can include a push notification to a second computing device 24 associated with the first computing device 24. For example, a push notification requesting confirmation of the input audio signal can be sent to a smartphone associated with the client computing device 24. The user can select the push notification to confirm that the input audio signal is authentic.

During the communication session between the client computing device 24 and the data processing system 70, the user can respond to the content item. The user can verbally respond to the content item. The response can be digitized by the sensor 151 and transmitted as a response audio signal 203 carried by a plurality of data packets to the data processing system 70. The auditory signal can also include characteristics, which can be analyzed by the network security appliance. If the network security appliance determines that an alarm condition persists based on the conditions of the response audio signal, the network security appliance can send a message 204 to the service provider computing device 60. The message 204 can include instructions for the service provider computing device 60 to disable the communication session with the client computing device 24.

Figure 10:
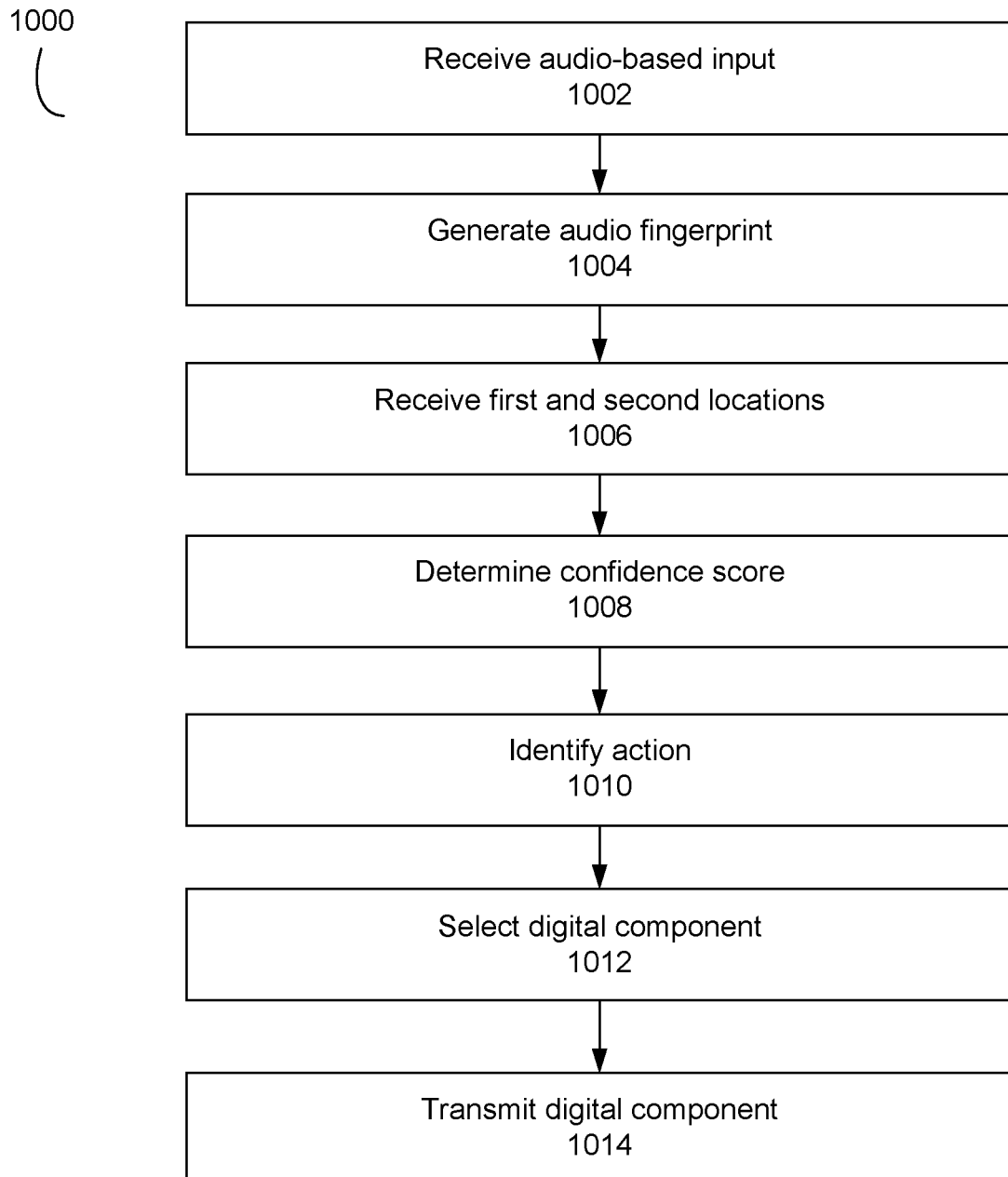
FIG. 10 illustrates an example method to authenticate packetized audio signals in a voice activated data packet (or other protocol) based computer network environment using the system illustrated in FIG. 1D.

FIG. 10 illustrates an example method 1000 to authenticate packetized audio signals in a voice activated data packet (or other protocol) based computer network environment. The method 1000 can include receiving an audio-based input (ACT 1002). The method 1000 can include generating an audio finger print (ACT 1004). The method 1000 can include receiving a first location indication and a second location indication (ACT 1006). The method 1000 can include determining a confidence score (ACT 1008). The method 1000 can include identifying an action based on the confidence score (ACT 1010). The method 1000 can include selecting a digital component (ACT 1012) and transmitting the digital component (ACT 1014).

The method 1000 can include receiving an audio-based input signal (ACT 1002). The audio-based input signal can be detected at a microphone or other sensor of a computing device. The computing device can be a speaker-based assistant computing device placed in a room of an office or home. The computing device can a TV, smartphone, tablet computer, or other type of computing device. The input signal can be a video, image, or text-based input signal. For example, the data processing system can execute, launch, or invoke the NLP component to receive packet or other protocol based transmissions via the network from the client computing device. The data packets can include or correspond to an audio-based input detected by the sensor, such as an end user saying "Ok, I would like to go to go dinner and then a movie tonight," "OK, change the TV channel," or "OK, start a video on the TV" into a smartphone or speaker-based assistant device.

The method 1000 can include generating an audio fingerprint (ACT 1004). The audio fingerprint can be generated by a feature cognition engine. The audio fingerprint can include pitch, cadence, and other characteristics identified in the audio-based input. In some implementations, a user cannot be identified from the audio fingerprint. For example, the audio fingerprint can categorize the audio-based input as coming from a male or female. The data processing system can use additional information to authenticate the user. In some implementations, the data processing system can generate a video or image fingerprint that identifies characteristics present in the video or image.

The method 1000 can include receiving a first and second location indication (ACT 1006). The first location indication can be received from the computing device that transmitted the audio-based input. The second location indication can be received by the data processing system from a different computing device than transmitted the audio-based input to the data processing system. The first location indication can be received by with the, or as a component of the, audio-based input. The data processing system can transmit a request the second location indication by sending a request to a computing device. The computing device can be a device owned by an authorized user of the computing device that transmitted the audio-based input to the data processing system.

The method 1000 can include determining a confidence score (ACT 1008). The confidence score can indicate the probability that the audio (or other) fingerprint is associated with a registered or authorized user of the computing device that transmitted the audio-based input. A user can be an authorized or registered user previously logging into the computing device with a user account. During the initial logging in or authentication phase, the user can provide a password or other form of authentication to the computing device to register with the computing device. For example, for a speaker-based assistant device, a user can become a registered user by speaking a password into the speaker or registering with a second device, such as a smart phone.

The confidence score can be based on the first and the second location indications. The confidence score can be based on the distance between the two physical locations indicated by the location indications. For example, if the distance between the physical locations is low (e.g., the two computing device are near one another), the network security appliance can determine there is a high confidence score that audio-based input is associated with an authenticated user because the data processing system determines that the registered user is near the device that transmitted the audio-based input to the data processing system. Alternatively, if the distance between the two locations is high then the data processing system can determine that the registered user is not near the device that transmitted the audio-based input to the data processing system. In some implementations, the data processing system can use proxies for physical locations. For example, the data processing system can determine whether the two computing device are on the same network and use a binary, yes/no, in place of, or in addition to, the distance between two computing device. The confidence score can be increased when the computing devices are on the same network. The confidence score can also be based on a facial recognition score that is generated by identifying a facial feature in an image or video received with the audio-based input. When the data processing system uses personal features, such as facial features capture through facial recognition, the user's consent to capture and analyze the features is required prior to capturing the personal features.

In some implementations, if the confidence score is low (e.g., below a predetermined threshold), the network security appliance can request an active authentication be provided. The active authentication can include transmitting an audio-based security question to the computing device that transmitted the audio-based input to the data processing system. The security question can be a request for a password. If a correct response is returned in response to the security question, the confidence score can be increased. Based on the response being correct, the confidence score can be increased above the predetermined threshold. Once above the predetermined threshold, the data processing system can proceed with one or more of the ACTs described herein.

In some implementations, when the confidence score for an audio fingerprint is low, the data processing system can terminate a session with the computing device that transmitted the audio-based input to the data processing system. For example, the data processing system can terminate the method 1000. The data processing system can send an alarm notification to the device a second computing device that the data processing system know is associated with the registered user, such as the user's smart phone.

In some implementations, the data processing system can request the first and second location indications and generate a confidence score based on a distance between the first and second physical locations of the first and second location indications. The confidence score can be related to the distance between the physical locations. For example, the confidence score can be higher for a separation distance that is small compared to a separation distance that is large because the data processing system can determine that second computing device, which is with the registered user, is near the first computing device that transmitted the audio-based input. The calculation of the confidence score can occur before the generation of the audio fingerprint. If the confidence score is above a predetermined threshold, the data processing system can use a fingerprint generation algorithm that is less computationally intensive as compared to when the confidence score is below the predetermined threshold. For example, the less computationally intensive algorithm may attempt to classify the audio-based input into general categories. The more computationally intensive algorithm can identify additional characteristics (e.g., pitch, cadence, frequency, etc) and can attempt to associate the audio-based input with a registered user.

The method 1000 can include identifying an action (ACT 1010). The action can be identified within the audio-based input. The action can be identified based on the confidence score being above a predetermined threshold. When the confidence score is above the predetermined threshold, the data processing system can determine the audio-based input was generated by a registered user of the first computing device. The data processing system can identify the action based on the audio-based input. For example, the NLP component can parse the audio-based input to identify requests (such as "dinner" or "movie" or "tv channel") as well as trigger keywords "go" "go to," "to go to," or "change" that corresponds or relate to the request.

The method 1000 can include generating a first action data structure based on the request. The direct action API can generate a data structure that can be transmitted and processed by the service provider computing device or content provider computing device to fulfil the request of the audio-based input. For example, continuing the above example the direct action API can generate a first action data structure that is transmitted to a restaurant reservation service. The first action data structure can perform a search for a restaurant that is located near the current location of the client computing device and that meets other specifications associated with the user of the client computing device (e.g., cuisine types preferred by the user of the client computing device). The direct action API can also determine a preferred time for the reservation. For example, the data processing system can determine the restaurant selected during the search is 15 minutes away and that the current time is 6:30 PM. The data processing system can set the preferred reservation time at a time after 6:45 PM. In this example, the first action data structure can include the restaurant name and the preferred reservation time. The data processing system can transmit the first action data structure to the service provider computing device or the content provider computing device. ACT 1006 can include generating multiple action data structures. For the above audio-based input, a second action data structure that includes a movie title and restaurant name can be generated and a third action data structure that includes pick up and drop off locations can be generated. The data processing system can provide the second action data structure to a movie ticket reservation service and the third action data structure to a car reservation service.

The method 1000 can also include comparing the first action data structure with a characteristic of the audio-based input. The network security appliance can compare the characteristic of the audio-based input to the first action data structure to determine the authenticity of the audio-based input. Determining the authenticity of the audio-based input can include determining whether the person that generated the audio-based input is authorized to generate audio-based inputs. The characteristics of the audio-based input can include a voiceprint, a keyword, a number of voices detected, an identification of an audio source (e.g., an identification of the sensor or client computing device from where the audio-based input originated), a location of an audio source, or the location of another client computing device (and the distance between the other client computing device and the audio source). For example, an authorized voiceprint can be generated during a setup phase by having a user speak passages. As those passages are spoken, the network security appliance can generate a voiceprint based on the frequency content, quality, duration, intensity, dynamics, and pitch of the signal. The network security appliance can generate an alarm condition if the network security appliance determines the characteristics of the audio-based input do not match the first action data structure or other expected data. For example, when generating an action data structure for "Ok, I would like to go to go dinner and then a movie tonight," the data processing system can generate an action data structure for a car reservation service that includes a pickup location based on the location of the user's smartphone. The action data structure can include the location. The audio-based input can be generated by an interactive speaker system. The location of the interactive speaker system transmitted to the data processing system with the audio-based input. In this example, if the location of the user's smartphone does not match the location of the interactive speaker system (or is not within a pre-defined distance of the interactive speaker system), then the user is not near the interactive speaker system and the network security appliance can determine the user most likely did not make the audio-based input. The network security appliance can generate an alarm condition. The distance between the client computing device 24 and a secondary client device (e.g., the end user's smartphone) can be calculated as a straight linear distance between the two devices, a driving distance between the two devices. The distance can also be based on travel time between the locations of the two devices. The distance may be based on other characteristics that can indicate location such as IP address and Wi-Fi network locations.

The method 1000 can include selecting a digital component (ACT 1010). The digital component can be selected based on the action identified in the audio-based input. The digital component can be select based on the trigger keyword. The digital component can be selected based on the alarm condition. The digital component can be selected via a real-time content selection process. The digital component can be selected to authenticate the audio-based input. The digital component can be a notification, online document, or message that is displayed on a client computing device, such as a user's smartphone. The digital component can be an audio signal that is transmitted to the client computing device and broadcast to the user via the transducer. The digital component can be a security question. The security question can be a predefined security question, such as a request for a password. The security question can be dynamically generated. For example, the security can be a question generated based on the prior history of the user or client computing device.

The method 1000 can include receiving data packets carrying auditory signals. The data packets can carry auditory signals transmitted between the client computing device and the conversational API of the data processing system. The conversational API can establish a communication session with the data processing system responsive to interaction with the digital component. The auditory signals can include the user's response to the digital component transmitted to the client computing device during ACT 1010. For example, the digital component can cause the client computing device to generate an audio signal asking, "what is your authorization code"? The auditory signals can include the end user response to the digital component. The end user response to the digital component can be a characteristic of the response audio signal.

The method 1000 can also include comparing a characteristic of the response audio signal with a characteristic of the audio-based input. The response audio signal can include a passphrase or other characteristics. The digital component can include instructions for the client computing device to capture one or more specific characteristics of the response audio signal. For example, the characteristic of the audio-based input can be a location of the client computing device. The characteristic of the response audio signal can be different than the characteristic of the audio-based input. For example, the characteristic of the response audio signal can be a voiceprint. The digital component can include instructions for capturing the voiceprint characteristic. The instructions can include capturing the response audio signal at a higher sampling frequency so that additional frequency content can be analyzed for the voiceprint. If the system does not detect a match between the characteristics of the response audio signal and the audio-based input, the system can set an alarm condition. For example, if the characteristics of the response audio signal include a passphrase that does not match a passphrase associated with the audio-based input, the alarm condition can be set.

If the characteristics of the response audio signal matches the characteristic of the audio-based input (e.g., the passphrases (or hashes thereof) match). A pass condition can be set. When a pass condition is set, the system can transmit instructions to a third-part to continue the communication session with the client device. The instructions to continue the communication session can authenticate the communication session for a predetermined amount of time such that the communication session does not need to be reauthenticated until expiration of the predetermined time.

The method 1000 can include transmitting the digital (ACT 1014). The data processing system can transmit the digital component to the computing device that transmitted the audio-based input to the data processing system. The data processing system can transmit the digital component to the computing device that did not transmit the audio-based input to the data processing system. For example, the data processing system can transmit the digital component to a computing device that is associated with the computing device providing the audio-based input. For example, the two computing devices can be linked through a common user account.

The method 1000 can also include transmitting an instruction to a third-party provider device to disable the communication session. Disabling the communication session can prevent messages and action data structures from being transmitted to the service provider device. This can improve network utilization by decreasing unwanted network traffic. Disabling the communication session can reduce computational waste because the service provider devices do not process requests that are malicious or generated in error.

Although an example computing system has been herein, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 135, content selector component 125, network security appliance 123, or NLP component 110 and other data processing system 70 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 70) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 10 can include clients and servers. A client and server are generally remote from each other and typically interact through a communication network (e.g., the network 50). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 70 from the client computing device 24 or the content provider computing device 40 or the service provider computing device 60).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, or the network security appliance 123 can be a single component, app, or program, or a logic device having one or more processing circuits, or part of one or more servers of the data processing system 70.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

We claim:

1. A system to secure data transmissions, comprising:
   one or more servers comprising one or more processors and memory;
   an interface of the one or more servers to receive an audio-based input detected by a microphone of a first computing device;
   a feature recognition engine of the one or more servers to generate an audio fingerprint based on the audio-based input; and
   a location engine of the one or more servers to:
      receive a first location indication associated with the first computing device, the first location indication representing a first physical location;
      receive a second location indication associated with a second computing device, the second location indication representing a second physical location;
   a network security appliance of the one or more servers to:
      determine, based on the audio fingerprint, the first location indication and the second location indication, a confidence score indicating a probability that the audio-based input is from a registered user of the first computing device having a profile stored on the one or more servers;
      identify, based on the confidence score being above a predetermined threshold, an action identified within the audio-based input, the action corresponding to a request by the registered user to activate or control a feature of the first computing device;
      select a digital component based on the action identified within the audio-based input; and
      transmit, to the first computing device via the interface, the digital component to cause the first computing device to present the digital component via an output interface of the first computing device.

2. The system of claim 1, comprising:
   the interface to receive an image comprising a facial feature;

the feature recognition engine to generate a facial recognition score based on a comparison between the image and a preregistered image; and the network security appliance to determine the confidence score based on the facial recognition score.

3. The system of claim 1, comprising:

the network security appliance to determine a second confidence score a second audio fingerprint of a second audio-based input is below the predetermined threshold;

the interface to transmit a request for active authentication; and the network security appliance to increase the second confidence score of the second audio fingerprint above the predetermined threshold responsive to receiving the active authentication.

4. The system of claim 1, comprising:

a natural language processor component executed by the one or more servers to receive, via the interface of the one or more servers, data packets comprising the audio-based input detected by the microphone of the first computing device;

the natural language processor component configured to parse the audio-based input to identify a request and a trigger keyword corresponding to the request;

a direct action application programming interface of the one or more servers to generate, based on the trigger keyword, a first action data structure responsive to the request;

the network security appliance to compare the first action data structure with a first characteristic of the audio-based input to detect an alarm condition;

a content selector component of the one or more servers to receive the trigger keyword identified by the natural language processor component and the indication of the alarm condition, and select, based on the trigger keyword and the indication, the digital component via a real-time content selection process.

5. The system of claim 1, comprising the network security appliance to:

receive data packets carrying a response audio signal transmitted between the first computing device and a conversational application programming interface that established a communication session with the first computing device responsive to interaction with the digital component;

compare a second characteristic of the response audio signal with a first characteristic of the audio-based input to detect a second alarm condition; and transmit, based on the second alarm condition, an instruction to a third-party provider device to disable the communication session established with the first computing device.

6. The system of claim 1, comprising the network security appliance to:

determine a first characteristic of the audio-based input;

receive a second audio-based input from the second computing device;

determine a second characteristic of the second audio-based input, wherein the first characteristic and the second characteristic comprise at least one of a voice print, a keyword, a number of voices detected, an identification of the first computing device, and a location of a source of the audio-based input.

7. The system of claim 1, comprising the network security appliance to:

determine a distance between the first physical location and the second physical location; and determine the confidence score based on the distance between the first physical location and the second physical location.

8. The system of claim 1, wherein the digital component comprises an audio-based security question.

9. The system of claim 1, comprising:

the interface to receive a second audio-based input;

the network security appliance to:

determine a second confidence score based on a second audio fingerprint of the second audio-based input;

compare the second confidence score to the predetermined threshold; and terminate a communication session based on the second confidence score being below the predetermined threshold.

10. The system of claim 1, comprising the network security appliance to:

determine the confidence score based on an amount of computational resources required to complete a request associated with the audio-based input.

11. A method to secure data transmissions, comprising:

receiving, by one or more servers, an audio-based input detected by a microphone of a first computing device remote from the one or more servers;

generating, by a feature recognition engine of the one or more servers, an audio fingerprint based on the audio-based input;

receiving, by a location engine of the one or more servers, a first location indication associated with the first computing device, the first location indication representing a first physical location;

receiving, by the location engine, a second location indication associated with a second computing device, the second location indication representing a second physical location;

determining, by a network security appliance of the one or more servers based on the audio fingerprint, the first location indication and the second location indication, a confidence score indicating a probability that the audio-based input is from a registered user of the first computing device having a profile stored on the one or more servers;

identifying, by the network security appliance and based on the confidence score being above a predetermined threshold, an action identified within the audio-based input, the action corresponding to a request by the registered user to activate or control a feature of the first computing device;

selecting, by the network security appliance, a digital component based on the action identified within the audio-based input; and transmitting, by the network security appliance and to the first computing device, the digital component to cause the first computing device to present the digital component via an output interface of the first computing device.

12. The method of claim 11, comprising:

receiving an image comprising a facial feature;

generating, by the feature recognition engine, a facial recognition score based on a comparison between the image and a preregistered image; and determining, by the network security appliance, the confidence score based on the facial recognition score.

13. The method of claim 11, comprising:
determining, by the network security appliance, a second confidence score of a second audio fingerprint of a second audio-based input is below the predetermined threshold;
transmitting, by the network security appliance, a request for active authentication; and
increasing, by the network security appliance, the second confidence score of the second audio fingerprint above the predetermined threshold responsive to receiving the active authentication.

14. The method of claim 11, comprising:
receiving, by a natural language processor component of the one or more servers to receive, via an interface of the one or more servers, data packets comprising the audio-based input detected by the microphone of the first computing device;
parsing, by the natural language processor component, the audio-based input to identify a request and a trigger keyword corresponding to the request;
generating, by a direct action application programming interface of the one or more servers, a first action data structure responsive to the request and the trigger keyword;
comparing, by the network security appliance, the first action data structure with a first characteristic of the audio-based input to detect an alarm condition;
selecting, by a content selector component of the one or more servers, the digital component in a real-time content selection process based on the trigger keyword and the indication of the alarm condition.

15. The method of claim 11, comprising:
receiving, by the network security appliance, data packets carrying a response audio signal transmitted between the first computing device and a conversational application programming interface that established a communication session with the first computing device responsive to interaction with the digital component;
comparing, by the network security appliance, a second characteristic of the response audio signal with the first characteristic of the audio-based input to detect a second alarm condition; and
transmitting, by the network security appliance and based on the second alarm condition, an instruction to a third-party provider device to disable the communication session established with the first computing device.

16. The method of claim 11, comprising:
determining, by the network security appliance, a first characteristic of the audio-based input;
receiving, by the network security appliance, a second audio-based input from the second computing device;
determining, by the network security appliance, a second characteristic of the second audio-based input, wherein the first characteristic and the second characteristic comprise at least one of a voice print, a keyword, a number of voices detected, an identification of the first computing device, and a location of a source of the audio-based input.

17. The method of claim 11, comprising:
determining, by the network security appliance, a distance between the first physical location and the second physical location; and
determining, by the network security appliance, the confidence score based on the distance between the first physical location and the second physical location.

18. The method of claim 11, comprising:
receiving a second audio-based input;
determining, by the network security appliance, a second confidence score based on a second audio fingerprint of the second audio-based input;
comparing, by the network security appliance, the second confidence score to the predetermined threshold; and
terminating, by the network security appliance, a communication session based on the second confidence score being below the predetermined threshold.

19. A system to secure data transmissions, comprising:
an interface to:
receive an authentication of a user; and
receive an audio-based input detected by a microphone of a first computing device; and
a location engine to:
receive a first location indication associated with the first computing device, the first location indication representing a first physical location;
receive a second location indication associated with a second computing device, the second location indication representing a second physical location;
a network security appliance to:
determine based on an audio fingerprint, the first location indication and the second location indication a confidence score indicating a probability that the audio-based input is from a registered user of the first computing device having a profile stored on a server;
identify, based on the confidence score being above a predetermined threshold, an action identified within the audio-based input;
select a digital component based on the action identified within the audio-based input; and
transmit, to the first computing device via the interface, the digital component.

20. The system of claim 19, comprising:
a feature recognition engine to generate the audio fingerprint based on the audio-based input.

* * * * *